(12) United States Patent
Ponomarev et al.

(10) Patent No.: US 12,560,514 B2
(45) Date of Patent: Feb. 24, 2026

(54) SENSOR ASSEMBLY, SYSTEM AND METHOD

(71) Applicant: Analog Devices International Unlimited Company, Limerick (IE)

(72) Inventors: Youri Victorovitch Ponomarev, Rotselaar (BE); Joyce Wu, Somerville, MA (US); Helen Berney, Pennywell (IE)

(73) Assignee: Analog Devices International Unlimited Company, Limerick (IE)

( * ) Notice: Subject to any disclaimer, the term of this patent is extended or adjusted under 35 U.S.C. 154(b) by 149 days.

(21) Appl. No.: 18/312,364

(22) Filed: May 4, 2023

(65) Prior Publication Data

US 2024/0369457 A1 Nov. 7, 2024

(51) Int. Cl.
| | |
|---|---|
| *G01N 1/16* | (2006.01) |
| *G01N 35/00* | (2006.01) |
| *G01N 1/10* | (2006.01) |

(52) U.S. Cl.
CPC ......... *G01N 1/16* (2013.01); *G01N 35/00584* (2013.01); *G01N 2001/1087* (2013.01); *G01N 2035/00207* (2013.01); *G01N 2035/00306* (2013.01); *G01N 2035/00346* (2013.01)

(58) Field of Classification Search
CPC .............. G01N 1/16; G01N 35/00584; G01N 2001/1087; G01N 2035/00207; G01N 2035/00306; G01N 2035/00346; G01N 33/543; G01N 1/2202; G01N 2001/222
USPC .... 73/1.01, 23.2, 335.02–335.5, 28.04, 29.5, 73/31.06, 31.07, 61.41, 61.43, 61.59, 73/61.61, 61.71, 61.72, 64.56, 863, 73/863.21, 864, 865.5; 422/82.01, 82.02; 377/6; 435/4, 287.1–287.3, 287.9, 288.1; 361/280, 281; 324/71.1, 71.4, 691–693, 324/698, 707, 713
See application file for complete search history.

(56) References Cited

U.S. PATENT DOCUMENTS

| | | | |
|---|---|---|---|
| 7,470,533 | B2 | 12/2008 | Xu et al. |
| 9,816,988 | B1 | 11/2017 | Paik et al. |
| 10,444,179 | B2 | 10/2019 | Paik et al. |
| 11,041,194 | B2 | 6/2021 | Clarke et al. |
| 11,065,615 | B2 | 7/2021 | Glezer et al. |
| 2004/0038426 | A1 | 2/2004 | Manalis |
| 2005/0026202 | A1 | 2/2005 | Edman et al. |

(Continued)

FOREIGN PATENT DOCUMENTS

| | | | | | |
|---|---|---|---|---|---|
| CN | 111051885 | A | * | 4/2020 | ........ B01L 3/502707 |
| EP | 2196796 | A1 | | 6/2010 | |

(Continued)

OTHER PUBLICATIONS

European Search Report received for European Patent Application No. 24174229.5, mailed on Oct. 29, 2024, 10 pages.

(Continued)

*Primary Examiner* — Robert R Raevis
(74) *Attorney, Agent, or Firm* — ArentFox Schiff LLP

(57) ABSTRACT

The present disclosure provides a sensor assembly for a target analyte. The sensor assembly comprises plural sensing sites, each of the sensing sites comprising one or more through holes. Each of the sensing sites has a different through hole configuration corresponding to a different property of the one or more through holes.

20 Claims, 6 Drawing Sheets

(56) References Cited

U.S. PATENT DOCUMENTS

| | | | |
|---|---|---|---|
| 2005/0191687 | A1 | 9/2005 | Wang et al. |
| 2008/0035180 | A1 | 2/2008 | Mutharasan et al. |
| 2008/0092649 | A1 | 4/2008 | Chen et al. |
| 2011/0031123 | A1 | 2/2011 | Schulze et al. |
| 2011/0036719 | A1 | 2/2011 | Neyts et al. |
| 2012/0142016 | A1 | 6/2012 | Ronaghi et al. |
| 2013/0270521 | A1 | 10/2013 | Peng et al. |
| 2015/0377830 | A1 | 12/2015 | Baldauf et al. |
| 2017/0226037 | A1 | 8/2017 | Johnson et al. |
| 2017/0356904 | A1 | 12/2017 | Paik et al. |
| 2019/0017954 | A1 | 1/2019 | Shin et al. |
| 2019/0391142 | A1 | 12/2019 | Jeon et al. |
| 2020/0200743 | A1 | 6/2020 | Paik et al. |
| 2020/0271604 | A1 | 8/2020 | Mohanty |
| 2020/0326297 | A1 | 10/2020 | Paik et al. |
| 2021/0114025 | A1 | 4/2021 | De Freitas Dias et al. |
| 2022/0196596 | A1 | 6/2022 | Swett |
| 2022/0252542 | A1 | 8/2022 | Merriman et al. |
| 2023/0097591 | A1 | 3/2023 | Doris et al. |

FOREIGN PATENT DOCUMENTS

| | | | | |
|---|---|---|---|---|
| EP | 2488866 | B1 | 4/2015 | |
| JP | 2006-322878 | A | 11/2006 | |
| WO | 2009/035647 | A1 | 3/2009 | |
| WO | 2009/155423 | A1 | 12/2009 | |
| WO | 2013/192178 | A1 | 12/2013 | |
| WO | 2015/196148 | A1 | 12/2015 | |
| WO | WO-2018078967 | A1 * | 5/2018 | ........ B01L 3/502715 |
| WO | 2020/176793 | A1 | 9/2020 | |
| WO | WO-2022232506 | A1 * | 11/2022 | .......... B01J 19/0046 |

OTHER PUBLICATIONS

Chatterjee et al., "Direct kinetic fingerprinting and digital counting of single protein molecules", PNAS research article applied biological sciences, vol. 117, No. 37, Sep. 15, 2020, p. 22815-22822.

Deamer et al., "Three decades of nanopore sequencing", In Nature biotechnology, vol. 34, No. 5, May 6, 2016, pp. 1-18.

Supplementary European search report received for European Patent Application No. 16773620.6, mailed on Sep. 13, 2018, 10 pages.

Fologea et al., "Slowing DNA Translocation in a Solid State Nanopore", In Nano Letters, vol. 5, No. 9, Aug. 9, 2005, 15 pages (Abstract Only).

Fujimoto et al., "Effects of different cations on the hydrodynamic radius of DNA", Biophysical Journal, vol. 67, Jul. 1994, pp. 304-308.

Hamidabad et al., "Translocation through a narrow pore under a pulling force", Scientific Reports, vol. 9, Article No. 17885, 2019, pp. 1-12.

Keyser et al., "Direct force measurements on DNA in a solid-state nanopore", Nature Physics, vol. 2, Jul. 2006, pp. 473-477.

Kiaee et al., "A pH-Mediated Electronic Wound Dressing for Controlled Drug Delivery", Advanced Healthcare Materials, vol. 7, Issue 18, Sep. 19, 2018, 25 pages.

Laureyn et al., "Microelectronics-Based Biosensors for the Detection of Proteins and Nucleic Acids", Sensors for Environment, Health and Security, 2009, pp. 319-332.

Lee et al., "Implementation of force differentiation in the immunoassay", Analytical Biochemistry, vol. 287, 2000, pp. 261-271.

Mahmoodi et al., "Single-step label-free nanowell immunoassay accurately quantifies serum stress hormones within minutes", Science Advances, vol. 7, No. 27, Jun. 30, 2021, 9 pages.

Minnella, Walter, "pH control in microfluidics: a short review, Introduction to pH control in microfluidics", LAPASO project, Innovative Training Networks, 2023, pp. 1-5.

Modarres et al., "Phase-controlled field-effect micromixing using AC electroosmosis", Microsystems & Nanoengineering, vol. 6, Issue 60, 2020, pp. 1-11.

Monteiro et al., "Measuring local pH in electrochemistry", Current Opinion in Electrochemistry, vol. 25, Feb. 2021, pp. 1-9.

Nikitin et al., "Magnetic Nanoparticle as a Tool for Remote DNA Manipulations at a Single-Molecule Level", ACS Applied Materials & Interfaces, Mar. 19, 2021, pp. S1-S17.

Pande et al., "Electrochemically Induced pH Change: Time-Resolved Confocal Fluorescence Microscopy Measurements and Comparison with Numerical Model", Journal of Physical Chemistry Letters, vol. 11, Jul. 28, 2020, pp. 7042-7048.

Purcell, E. M., "Life at low Reynolds number", Physics and Our World, 1977, 2 pages (Abstract Only).

Sadeghian et al., "Interdigitated electrode design and optimization for dielectrophoresis cell separation actuators", Journal of Electrostatics, vol. 86, Apr. 2017, pp. 41-49.

Sevenler et al., "Beating the reaction limits of biosensor sensitivity with dynamic tracking of single binding events", PNAS research article engineering, vol. 116, No. 10, Mar. 5, 2019, pp. 4129-4134.

Strunz et al., "Dynamic force spectroscopy of single DNA molecules", Proc. Natl. Acad. Sci., vol. 96, Sep. 1999, p. 11277-11282.

Tropini et al., "Multi-Nanopore Force Spectroscopy for DNA Analysis", In Biophysical Journal, vol. 92, Issue 5, Mar. 2007, pp. 1632-1637.

Ying et al., "Nanopore-based technologies beyond DNA sequencing", Nature Nanotechnology, vol. 17, Nov. 2022, pp. 1136-1146.

Zeng et al., "Dynamic single-molecule sensing by actively tuning binding kinetics for ultrasensitive biomarker detection", PNAS, vol. 119 No. 10 e2120379119, 2022, pp. 1-7.

Extended European Search Report and Search Opinion received for European Application No. 241174227.9, mailed on Oct. 16, 2024, 10 pages.

Extended European Search Report and Search Opinion received for European Application No. 24174226.1, mailed on Sep. 26, 2024, 8 pages.

Extended European Search Report and Search Opinion received for European Application No. 24174230.3, mailed on Oct. 21, 2024, 10 pages.

Gomes et al., "The increasing dynamic, functional complexity of bio-interface materials", Nature Reviews Chemistry, vol. 2, No. 3, Article No. 0120, Mar. 7, 2018, pp. 1-15.

Lu et al., "Plasmonic-Based Electrochemical Impedance Spectroscopy: Application to Molecular Binding", Analytical Chemistry, vol. 84, 2012, pp. 327-333.

Luo, Ruben, "Protein interaction analysis Guide to SPR Data Analysis on the ProteOn™ XPR36 System", Bulletin 6300, BIO-RAD Laboratories, Inc., 2013, 8 pages.

Non-Final office action received for U.S. Appl. No. 18/312,071, mailed on May 21, 2025, 30 pages.

Non-Final office action received for U.S. Appl. No. 18/312,113, mailed on Jun. 10, 2025, 19 pages.

Polonschii et al., "Complementarity of EIS and SPR to Reveal Specific and Nonspecific Binding When Interrogating a Model Bioaffinity Sensor; Perspective Offered by Plasmonic Based EIS", Analytical Chemistry, vol. 86, 2014, pp. 8553-8562.

Rich et al., "Chapter-1—The Revolution of Real-time, Label-free Biosensor Applications", Wiley, Label-Free Technologies for Drug Discovery, Dec. 14, 2010, pp. 1-25.

Sullivan et al., "A simulation and experimental study of electrochemical pH control at gold interdigitated electrode arrays", Electrochimica Acta, Article 139113, vol. 395, 2021, pp. 1-29.

\* cited by examiner

SENSOR ASSEMBLY, SYSTEM AND METHOD

FIELD OF THE DISCLOSURE

This disclosure relates to sensor assemblies, such as biological or chemical sensor assemblies, for determining a property of a target analyte in a sample and systems and methods for determining a property of a target analyte in a sample.

BACKGROUND

Various biological and chemical assay are known for sensing analytes. Analytes may, for example, include biomarkers, such as hormones, established to assist in patient monitoring and/or diagnosis.

Although rapid improvements in the selectivity and sensitivity of these sensors have been made over the past decades, there is still a need to improve the selectivity, sensitivity and speed of measurement, particularly for biological sensing systems. For example, often there is a trade-off between sensitivity and the range of concentrations that can be detected. A sensor which can measure across a broad range of concentrations will often lack accuracy. Conversely a sensor which is very accurate will often have a narrow dynamic range.

In biosensors and assays, such as standard enzyme-linked immunosorbent assays (ELISA), employed for quantifying analytes such as peptides, proteins, antibodies, and hormones, it has been found to be challenging to make quantitative measurements of analytes over a wide range of concentrations.

There is also a desire to obtain a measurement more quickly. Many sensors, particular biosensors, rely on the binding of a target analyte with a capture species. The rate determining step in obtaining a measurement is typically the time it takes for the target analyte to reach the capture species (e.g. due to flow and diffusion) and to bind to the capture species. Many sensors require an equilibrium to be established, which can take a relatively long time. It would be advantageous to provide a way of obtaining an accurate measurement quickly.

SUMMARY OF THE DISCLOSURE

The present disclosure provides a sensor assembly for a target analyte. The sensor assembly comprises plural sensing sites, each of the sensing sites comprising one or more through holes. Each of the sensing sites has a different through hole configuration corresponding to a different property of the one or more through holes.

In one aspect, there is provided a sensor assembly for a target analyte, comprising: a plurality of sensing sites, each sensing site comprising: a sensing element, the sensing element comprising a sensing layer comprising an upper surface and a lower surface and one or more through holes, each of the one or more through holes extending from the upper surface to the lower surface; and a capture species configured to specifically bind with a target analyte provided to the sensing layer. Each sensing element provides a measurement signal indicative of the interaction of the target analyte with the sensing layer. Each sensing site has a through hole configuration corresponding to a property of the one or more through holes, and wherein the through hole configuration of each sensing site is different.

In another aspect, there is provided a system for determining a property of a target analyte in a sample, the system comprising a sensor assembly according to any of the embodiments disclosed here; and a control unit configured to determine the property of the analyte. The control unit is configured to determine the property of the analyte based on a measurement signal from at least one sensing site of the plural sensing sites.

In another aspect, there is provided a method for determining a property of an analyte in a sample, the method comprising: providing a sensor assembly according to any of the embodiments disclosed herein; providing a sample to the sensor assembly; and determining the property of the target analyte based on measurement signal from at least one sensing site of the plural sensing sites.

BRIEF DESCRIPTION OF THE DRAWINGS

The present invention will now be described in more detail with reference to the accompanying drawings, which are not intended to be limiting.

DETAILED DESCRIPTION

Figures 1, 2A, 2B:
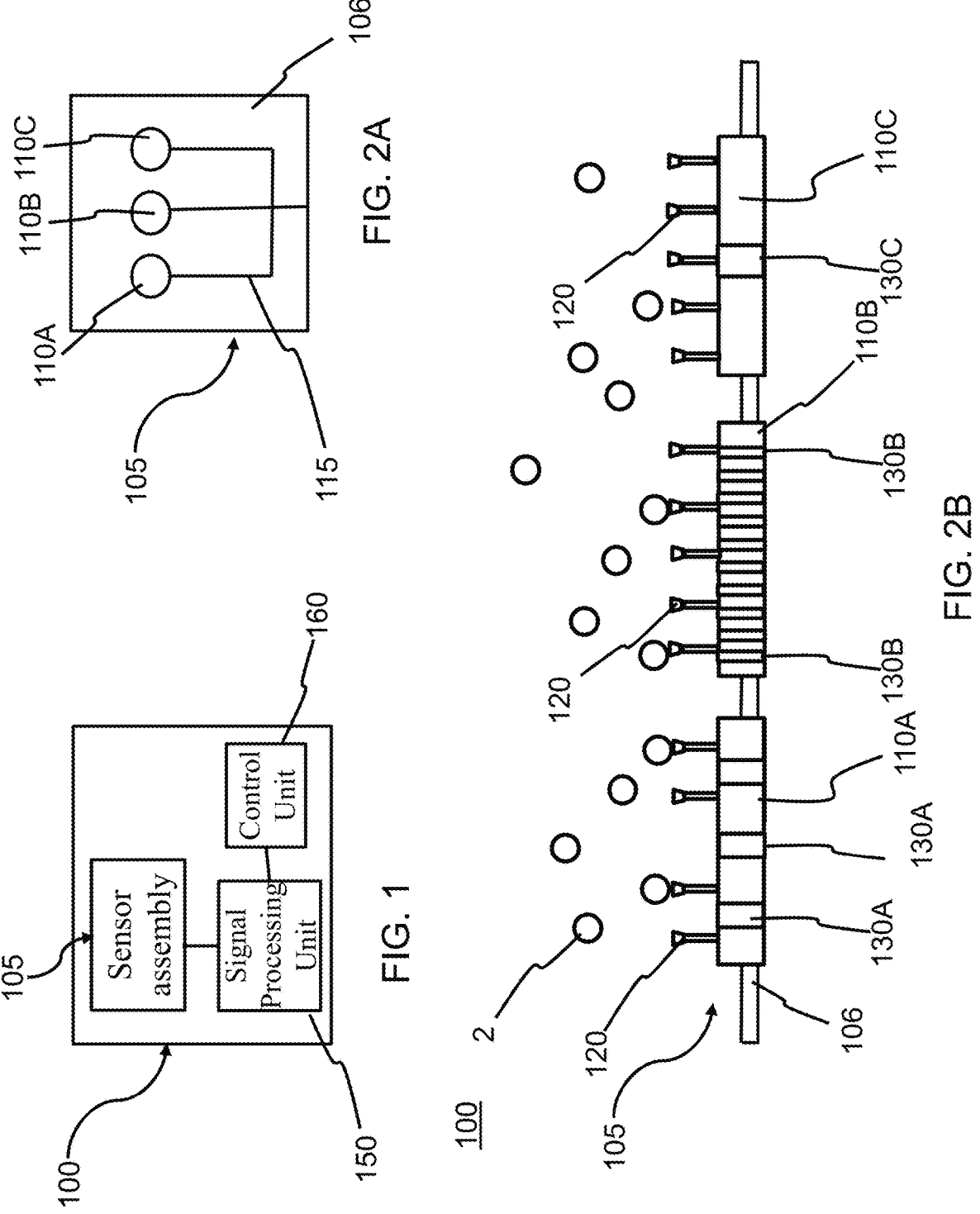
FIG. 1 provides a schematic plan view of a system according to an embodiment.
FIG. 2A provides a schematic plan view of a sensor assembly according to an embodiment.
FIG. 2B provides a schematic cross-sectional view of a part of the sensor assembly of FIG. 2A according to an embodiment.

Various analyte sensing techniques are known. However, quantitative measurement of analytes over a wide range of concentrations is a challenge. Typically there is a trade-off between sensitivity and the range of concentrations that can be detected. It would also be advantageous to improve the speed of measurement.

In one aspect, there is provided a sensor assembly for a target analyte, comprising: a plurality of sensing sites, each sensing site comprising: a sensing element, the sensing element comprising a sensing layer comprising an upper surface and a lower surface and one or more through holes, each of the one or more through holes extending from the upper surface to the lower surface; and a capture species configured to specifically bind with a target analyte provided to the sensing layer. Each sensing element provides a measurement signal indicative of the interaction of the target analyte with the sensing layer. Each sensing site has a through hole configuration corresponding to a property of the one or more through holes, and wherein the through hole configuration of each sensing site is different.

Embodiments provide systems and methods which have improved sensor functionality and versatility, including a wider sensor dynamic sensing range without sacrificing accuracy, improved speed of analysis and improved confidence in the identification of a target analyte.

The sensor assembly includes plural sensing sites, each having one or more through hole(s) in a sensing layer and a different through hole (or "pore") configuration defined by at least one property of the one or more through holes. This through hole configuration contributes to the response (as measured by the measurement signal) of each sensing site to the target analyte, such that the different configurations provide or contribute to the sensing sites each providing a different response. In this way, the sensor assembly can be used to determine a property of the target analyte using measurement signals from at least two sensing sites.

Without wishing to be bound by theory, the through hole configuration impacts the response as a result of the interaction of the analyte with the through holes directly, for example as the analyte is received within the through holes and may, for example, pass through the through holes. This can modify the material properties of the sensing layer of each site, which properties can then be detected. Different through hole configurations will lead to different magnitude changes in the presence of analyte. Further, in some embodiments, this is also in part due to a modification of an applied electric field on the sensing element due to the presence of the through holes. Specifically, the through holes may act as a field confinement feature which can retain analyte within the through holes, increasing sensitivity.

The presence of plural sensing sites, each having a different response, provides a number of advantages. For example, the presence of two different, individually readable sites with a specificity for the same target analyte allows for each site to have a different dynamic sensing range based at least in part on the through hole configuration of the respective capture species. Depending on the property of the target analyte in the sample, the optimal site for determining the property can be used. This could be a selection of a sensing site in which the amount of target analyte is expected to be within a substantially linear or well-defined range. For example, this could be the optimal site for determination of a particular concentration. The system can therefore alter detection properties such as the sensitivity or detection limits depending on the property of the target analyte. Embodiments may use a site with a broad response to estimate the property of the analyte, before a site with an optimal configuration is selected for the measurement.

The use of plural sites together can improve the accuracy of the determination. Each of the sites will have a different response to the presence of the analyte and this response can be combined to provide a more accurate determination. Each may provide a response which together can be used to observe a fingerprint or response across the plural sites which is unique to the presence and amount of the target analyte. This may be based on the binding profile and/or a kinetic analysis of the measurement signal for each site. Each may also have an identical or near identical baseline in the absence of the analyte, which can be used to compensate for noise and increase accuracy.

Sensor Assembly Structure

The sensor (or sensing) assembly comprises plural sensing sites, each of the sensing sites comprising a capture species configured to specifically bind with the target analyte and each site providing a measurement signal indicative of the interaction of the respective sensing site with the target analyte. In other words, the sensor assembly comprises: a first sensing site having one or more through holes with a first through hole configuration and providing a first measurement signal indicative of the interaction of the first sensing site with the analyte; and a second sensing site comprising one or more through holes with a second through hole configuration and providing a second measurement signal indicative of the interaction of the second sensing site with the analyte, wherein the first through hole configuration and the second through hole configuration are different. In some embodiments, the sensor assembly may further comprise a third sensing site comprising a capture species and one or more through holes with a third through hole configuration, the third sensing site providing a third measurement signal indicative of the interaction of the third sensing site with the analyte, wherein the third through hole configuration is different to the first and second through hole configurations.

The sensing sites are each formed of a sensing element comprising a sensing layer, through which layer there are one or more through holes. The sensing layer may be comprised of a single layer of material in which through holes (also referred to as vias or pores) are formed in. Alternatively, or additionally, this may comprise plural layers in a stacked arrangement with the through hole extending from the upper surface of the uppermost layer to the lower surface of the lowermost layer. In some embodiments, the layer may comprise plural coplanar layers, where the layers are adjacent to one another and form the through hole therebetween (i.e. with the through hole extending in the gap between the two layers). In some embodiments, the sensing elements will each comprise an electrode or electrodes for interrogating the sensing layer. These may be formed as part of the sensing layer such that the sensing layer comprises these, in which cases the through holes may also extend through the electrode(s), or the sensing element may comprise these as a separate component.

In embodiments, each sensing site, or in some embodiments each sensing layer, may comprise analyte interaction portions defined by the respective capture species, where each capture species is provided adjacent or on the sensing layer of the respective sensing site. The capture species may be located adjacent to (i.e. next to or abutting) or in the through holes of the sensing layer such that analyte bound to the capture species can interact with (e.g. move into and/or through) the through holes so as to alter impedimetric properties of the sensing layer. The captures species may therefore surround the through holes, in some embodiments. In embodiments, the capture species is provided on the sensing layer, for example, it may be bound to the sensing layer. The capture species may be provided on the upper and/or lower surfaces of the sensing layer. In some embodiments, the sensing element is functionalized with the capture species. Such functionalization can be achieved in any suitable manner, such as by covalently or non-covalently immobilizing the capture species to the surface. In some embodiments, the capture species may be configured to permit movement of specifically-bound analyte through and out of the through holes. The capture species may be of sufficient length and/or flexibility to permit this. Such functionalization can be achieved in any suitable manner, such as by covalently or non-covalently immobilizing the capture species to the surface. For example, thiol-terminated capture species, such as a thiol-terminated aptamer, can be immobilized, for example grafted, onto the surface of a noble metal, for example gold, electrode.

More generally, the sensing sites are arranged to receive a sample. The sample comprises a sample matrix in which there may be the target analyte and other components. Thus, the sample may comprise a carrier (such as a liquid) and the analyte. The sample matrix may be, for example, blood, urine, sweat, tears, etc., and may (potentially) contain the analyte.

Each sensing site is an individually readable or addressable sensing site so that a measurement signal for each individual site can be obtained. Each sensing site may therefore be a separate sensing element or layer, such as an electrode or field effect transducer (FET). In other embodiments, the sites may be on a common element, with individually addressable regions. In embodiments, the electrodes disclosed herein (e.g. the IDE, such as the first and second electrode of the IDE) may be formed from or comprise metals, metal oxides, metal nitrides, carbon-based materials, a conductive polymer, doped silicon or polysilicon or combinations thereof. In an embodiment, the electrodes may be formed from or comprise gold, silver, copper, platinum, nickel, titanium, titanium nitride, ruthenium, ruthenium oxide or combinations thereof.

In the methods and system disclosed herein, the transducer mechanism(s) used to determine the measurement signal may be any suitable method of transduction. For example, this may comprise measuring the potential (e.g. voltage), current, permittivity, charge, frequency and/or thermal response or properties. In some embodiments, each sensing site comprises at least one working electrode. Changes in or interactions with the functional layer formed by the capture species can be detected through changes in potential. In other embodiments, changes may be determined by monitoring changes in current passing through each sensing site (at a constant potential).

The sensing site can be a sensing layer (e.g. an electrode). In some embodiments, this may comprise or be formed from copper, nickel, platinum, silver, silver chloride, gold or other noble metals. In some embodiments, this may comprise or be formed from $TiO_2$ or indium tin oxide (ITO). Other sensing sites may include a substrate with a coating on which the anchor species is immobilized. For example, the sensing site may be a glass substrate with an ITO coating thereon. In other embodiments, the sensing site may comprise or be formed of carbon (graphene, graphene oxide, or nanotubes), silicon dioxide, aluminum oxide, and/or silicon. Sensing layers can provide immobilization of capture species through both covalent-like interactions (e.g. chemisorption of anchor species onto the surface through chemical bond formation) and non-covalent-like interactions (e.g. physisorption of capture species onto the surface through weaker, often van der Waals, interactions) depending on the identity of the surface and the capture species. Provision of the capture species to the sensing site can be achieved through techniques such as spin-coating, physical vapour deposition or electrophoretic deposition. Alternatively, other methods can include immersion of the sensing site in solution.

The sensing layer may comprise or be a dielectric layer. In embodiments, the dielectric layer may comprise or be a polymer layer, a glass layer, a glass-ceramic layer, a ceramic layer, a metal oxide layer, a metal nitride layer. A silicon-based layer or combinations thereof. In certain embodiments, the dielectric layer comprises or is a polyimide, silicon dioxide, or silicon nitride layer. In some embodiments, the sensing layer is a nanoporous membrane, with the nanopores forming the through holes on the nano scale (e.g. 1 to 1000 nm, such as 1 to 100 nm).

In one embodiment, the sensor assembly further comprises a fluid chamber for receiving a sample, wherein each sensing layer is arranged in the fluid chamber such that sample can reside above the upper surface, reside below the lower surface and pass through the through holes in the sensing layer. This allows for the provision of sample above and below each sensing layer and within the through holes, which enables further information to be gathered on the target analyte and permits manipulation and movement through the through holes.

Through Holes

Through Hole Configuration

By "through hole configuration" it is referring to at least one the property of the through hole(s), such that the through hole configuration being different means that at least one property of the through hole(s) of the different sites is different such that there is a different response provided by each of the sites in the presence of the target analyte, and in particular the same or an identical sample (i.e. with the same amount of target analyte).

In one embodiment, the property forming the through hole configuration may be the number, arrangement and/or dimensions of the through hole, such that having a different through hole configuration provides the plural sensing elements with different interactions, and thus different responses, with the target analyte.

In one embodiment, the property of the one or more through holes is or comprises the dimensions of the one or more through holes of each of plurality of sensing sites, the dimensions being selected from the depth or largest diameter of the one or more through holes. In one embodiment the property of the one or more through holes is or comprises the arrangement of the one or more through holes of each of the plurality of sensing sites, selected from density of the one or more through holes, spacing between the through holes and/or relative position of the through holes. The density corresponds to the number of through holes per unit area of the sensing layer. The relative position is relative to the other through holes of the same sensing layer, where present. For example, each site may comprise a plurality of through holes arranged in an array having a particular shape, with each site having a different array shape. These properties have been found to have a substantial impact on the response of the sensing element such that the different sites will have a different response. In some embodiments, the property of the one or more through holes comprises the shape of the through hole or structure of the through hole, provided this has an impact on the response of the sensing element to the target analyte. For example, the through hole may have a cylindrical shape (e.g. with substantially circular or circular openings) or may take the form of channels or slits. For example, in some embodiments, the through holes may comprise microstructures provided on an interior surface thereof. A difference in these microstructures can provide a difference in response.

It will be appreciated that more than one property may be altered to provide a different in response. In some embodiments, all other properties of the through holes may be the same for each of the sites. For example, in some embodiments, the number or density of through holes may differ across the plural sensing sites, but the dimensions of the through holes may remain the same across all sites (or the reverse). In embodiments, the sensing layer of each of the plural sites may be formed of the same material and the only difference between sites comprises the through hole configuration.

In some embodiments, all of the through holes on each of the sensing layers comprise the through hole configuration. In others, only some of the through holes may comprise the through hole configuration which is different to those of the other pores. For example, it may be that each sensing site comprises plural through holes but only some of these have a different through hole configuration than the other site(s) (provided there is one or more through hole with a different through hole).

Through Hole Properties

In one embodiment, the one or more through holes of each of the plurality of sensing sites have a largest diameter of less than or equal to 2 μm and a depth of less than or equal to 2 μm. By largest diameter, it is meant that the width at the widest point. This may be at one of the upper or lower surfaces of the sensing layer. Where the property by which the through hole configuration varies is the diameter, there may be a variation in largest diameter of at least 1%, such as at least 5% or at least 10% between sensing sites.

In one embodiment, the one or more through holes of each of the plurality of sensing sites have a largest diameter (at their widest point) less than or equal to 2 μm, for example from 50 nm to 1 μm. In some embodiments, the through holes have a diameter (at their widest point) of less than or equal to 1000 nm, for example less than or equal to 800 nm, less than or equal to 500 nm. This may be from 1 nm to 2000 nm, 1 nm to 1000 nm, 1 nm to 800 nm, 1 nm to 500 nm, such as 10 nm to 1000 nm, 10 nm to 800, 10 nm to 500 nm, 50 nm to 2000 nm, 50 nm to 1000 nm, 50 nm to 800, 50 nm to 500 nm, 100 nm to 1000 nm, 100 nm to 800, or 100 nm to 500 nm. In one embodiment, the through holes have a narrowest diameter of at least 0.5 nm, for example at least 1 nm, or at least 10 nm. Through hole radius will impact the response to an analyte: a larger through hole will have a response which is more dependent on the materials within it. A smaller through hole may be selective to particular analytes. Smaller holes have also been found to provide a higher electric field (field confinement), increasing sensitivity.

In some embodiments, the depth of the through hole may be less than or equal to 2 μm, for example less than or equal to 1000 nm, for example less than or equal to 800 nm, less than or equal to 500 nm. In one embodiment, the one or more through holes of each of the plurality of sensing sites have a depth of from 100 nm to 2 μm. This may be 1 nm to 1000 nm, 1 nm to 800 nm, 1 nm to 500 nm, such as 10 nm to 1000 nm, 10 nm to 800, 10 nm to 500 nm, 50 nm to 1000 nm, 50 nm to 800, 50 nm to 500 nm, 100 nm to 1000 nm, 100 nm to 800, or 100 nm to 500 nm. Exemplary combinations include a diameter of 1 nm to 1000 nm and a depth of 1 nm to 1000 nm, such as 10 nm to 500 nm and 10 nm to 500 nm depth. In one embodiment, the depth of the through hole is from 0.15 μm to 1 μm. Across these depths, noticeable changes in electric field strength and responses have been found, without causing significant variation of electric field across each individual sensing site. The depth can be measured from the upper surface of the sensing layer to the lower surface of the sensing layer.

In embodiments, the sensing layer has a thickness of less than or equal to 2000 nm, less than or equal to 1000 nm, for example less than or equal to 800 nm, less than or equal to 500 nm. This may be 1 nm to 1000 nm, 1 nm to 800 nm, 1 nm to 500 nm, such as 10 nm to 1000 nm, 10 nm to 800, 10 nm to 500 nm, 50 nm to 1000 nm, 50 nm to 800, 50 nm to 500 nm, 100 nm to 1000 nm, 100 nm to 800, or 100 nm to 500 nm. In some embodiments where the through holes extend through the sensing layer (only), the through holes have a corresponding depth.

In one embodiment, at least one sensing site (specifically, sensing layer) comprises a plurality of through holes, and wherein the through holes are spaced apart by at least 200 nm, at least 500 nm, at least 1000 nm, or at least 2 μm. In some embodiments, this may be from 200 nm to 30 μm, for example from 1 μm to 20 μm, from 2 μm to 20 μm or from 4 μm to 20 μm. In some embodiments, each of the plurality of sensing sites comprises a plurality of through holes, and wherein the through holes are spaced apart by at least 200 nm, at least 500 nm, at least 1000 nm, or at least 2 μm. Each of the ranges disclosed herein for one sensing site can apply to each sensing site. These ranges have been found to provide a useful range in which the electric field can vary without impacting performance. It has been found in particular that increasing the through hole spacing from ~50 nm increases the electric field, thus increasing specificity, without reducing molecular transport efficiency. This increase is particularly fast in the range up to 5 μm, after which it levels off. The higher field provided is beneficial but with there are diminishing returns as transport becomes less efficient. Accordingly, the ranges recited herein are particularly effective.

In one embodiment, each sensing site comprises a plurality of through holes having a largest diameter of less than or equal to 1000 nm, such as from 100 nm to 1000 nm, a depth of from 100 nm to 2 μm, such as 100 nm to 1 μm, and wherein the through holes on each of the sensing sites are spaced apart by a spacing of from 1 μm to 20 μm, such as 2 μm to 10 μm.

The density (e.g. the number per unit area) of through holes present in the sensing layer will impact the response to the presence of an analyte. In some embodiments, the through holes may define at least 2% of the surface area of each the upper surface and/or lower surface of the sensing layer contributing to the measurement signal, for example at least 5%, at least 10%, at least 20%. A maximum surface area may be 40%. By "contributing to", this may in embodiments refer to the sensing layer located between (e.g. directly between) electrodes used to determine the measurement signal. Measurement may be carried out using SEM or TEM, for example.

In some embodiments, each sensing site has been 1 and 1000 through holes, such as 1 to 500 through holes, such as 1 to 20, 1 to 100, 1 to 500, 2 to 20, 2 to 100 or 2 to 500 through holes. In embodiments, each sensing site may comprise a line or array of through holes.

Where the property by which the through hole configuration varies is the dimensions of the through hole and/or spacing, for example according to the embodiments set out above, in embodiments there may be a variation in dimension(s) providing the difference in through hole configuration of at least 1%, such as at least 5%, or at least 10% between the plural sensing sites.

At these sizes, and particularly the diameter, the analyte can have a significant effect on the material properties of the layer, such as permittivity. Moving analyte in and out of the through holes will therefore provide a significant response, thereby providing additional information as compared to simply receiving analyte on a surface. Movement within and around the through holes can be facilitated by the capture species, which may be bound to the sensing element (in some embodiments, the sensing layer) adjacent the through holes.

Analyte/Capture Species

The capture species (singular, or in embodiments a plurality of capture species) on each sensing site specifically binds to the target analyte. By this it is meant that each of the capture species binds to a particular site or moiety on the target analyte. The capture species may be the same or different on each sensing site. Any suitable analyte capture species can be selected, according to the target analyte which is intended to be sensed by the sensor assembly. For example, each capture species may comprise an antibody with specificity for a particular antigen. In such an example, the analyte may take the form of the antigen. More generally, each capture species may, in some embodiments, comprise at least one selected from a protein, a peptide, a carbohydrate, and a nucleic acid. The protein may, for example, be an enzyme, such as an enzyme having specificity for the analyte. In other non-limiting examples, the protein is an antibody. In the latter case, the analyte may be an antigen which is specifically bound by the antibody. Each capture species may, for instance, comprise or be defined by an antigen. In this case, the analyte may be a species, such as an antibody, which is specifically bound by the antigenic capture species. The antigen may be or comprise, for example, a protein, a peptide, a carbohydrate, such as a polysaccharide or glycan. In an embodiment, each capture species is a capture antibody.

In an embodiment, each capture species comprises an aptamer. An aptamer may be defined as an oligonucleotide or peptide configured to bind the analyte. Such an aptamer may, for example, be configured to interact with, for example bind, various analyte types, such as small molecules, for example amino acids or amines, proteins, metal ions, and microorganisms.

One common assay type is enzyme-linked immunosorbent assay (ELISA). ELISA is a so-called sandwich-assay used for quantifying analytes such as peptides, proteins, antibodies, and hormones. These use a recognition element for selectively (specifically) interacting with, for example binding, the analyte of interest. The recognition element is immobilized on a suitable support. For example, an antigen is immobilized on the support and then complexed with an antibody that is linked to an enzyme. In one embodiment, the method further comprises providing a detection species to the sample matrix, the detection species specifically-binding to the target analyte. The detection species may be provided when the analyte is specifically bound to the capture species or before this occurs. The detection species may be an amplification species or may be a different species, for example provided with the purpose of increasing the selectivity of the measurement. This can be a sandwich assay. In some embodiments, the method is a sandwich ELISA method of detecting a property of an analyte, with each capture species being a capture antibody, the detection species being a detection antibody which may comprise double stranded DNA provided thereon. The DNA may be bound to the detection antibody via a linker, such as streptavidin and biotin.

In another embodiment of the methods, sensor assembly and systems disclosed herein, these can be used to distinguish between minor mutations or modifications of analyte species, such as biomolecules or structures. Specifically, there is a need to be able to distinguish between the types of modifications or differences which occur, either through modification or during synthesis, in species such as DNA or proteins. Traditional methods such as chromatography or mass spectroscopy focus on the mass and/or size of these species, making it different to distinguish where structural differences exist but where the mass or size differences are too small to reliably determine or filter out mismatches. This is particularly the case for biomolecules, where the relative size or mass of the total molecule is typically large as compared to the difference in physical size or mass resulting from the mismatch.

For example, in one embodiment of the methods, sensor assembly and systems disclosed herein, these can be used to identify DNA or RNA mismatches or differentiate/separate DNA or RNA based on the degree of differentiation. DNA or RNA mismatches can occur during the synthesis (e.g. by replication) of DNA or RNA where there is a mismatch between the original DNA or RNA and the synthesized version. This can be as a result of inserting an incorrect nt (or base pair) or deletion of a base pair, for example. Another example is a modification, for example as a result of glycosylation of the DNA/RNA. Such mismatches will alter the binding affinity between the capture species and the DNA or RNA (i.e. analyte) of interest due to a mismatch between the capture species and the analyte. A complete match will have a first binding affinity, some minor mismatch may still bind but with a lower affinity, and more mismatched bases will lead to no selective binding of the capture species and the DNA/RNA. Distinction between the binding components can be determined by the binding affinity, and specifically by the force required to remove the DNA/RNA being analyzed. The use of several regions with different affinities for the analyte will also result in different affinities for the mismatched DNA resulting in different responses and allowing distinction of these.

System and Method

The system may be configured to perform any of the method steps disclosed herein. Moreover, any of the embodiments set out herein with respect to the method apply equally to the system, and any of the embodiments set out herein with respect to the system apply equally to the method. In embodiments, the control unit of the system may be configured to carry out any of the method steps set out herein.

In one aspect, there is a system for determining a property of a target analyte in a sample, the system comprising: a sensor assembly according to any of the aspects set out herein; and a control unit configured to determine the property of the analyte. The control unit is configured to determine the property of the analyte based on a measurement signal from at least one sensing site of the plural sensing sites, in some embodiments all of the plural sensing sites.

In one embodiment, the system may further comprise a signal processing unit configured to process measurement signals received from the sensor assembly; and the control unit may receive processed signals and determined the property based on the processed signals. The control unit may, in certain embodiments, be configured to determine the property based on (at least) the absolute change in measurement signal and/or the rate of change of the signals. The control unit and/or signal processing unit may each (individually or combined) be a processor or controller. The control unit may incorporate the signal processing unit or may be in addition to this. The control unit and signal processing unit may be implemented in any suitable manner, with software and/or hardware, to perform the various functions required. One or both of the units may, for example, employ one or more microprocessors programmed using software (for example, microcode) to perform the required functions. Examples of processor components that may be employed in various embodiments include, but are not limited to, conventional microprocessors, application specific integrated circuits (ASICs), and field-programmable gate arrays (FPGAs).

In various implementations, the control unit and/or the signal processing unit may be associated with one or more non-transitory storage media such as volatile and non-volatile computer memory such as RAM, PROM, EPROM, and EEPROM. The non-transitory storage media may be encoded with one or more programs that, when executed on one or more processors and/or controllers, perform the required functions. Various storage media may be fixed within a processor or controller or may be transportable, such that the one or more programs stored thereon can be loaded into the signal processing unit, property determination unit and/or control unit.

In some non-limiting examples, the system includes a user interface, such as a display, for communicating the analyte property determined by the property determination unit. Alternatively or additionally, the system may include a communications interface device, such as a wireless transmitter, configured to transmit the analyte concentration determined by the property determination unit to an external device, such as a personal computer, tablet, smartphone, remote server, etc.

In one aspect, a method for determining a property of an analyte in a sample comprises providing a sensor assembly according to any of the embodiments disclosed herein, providing a sample to the sensor assembly; and determining the property of the target analyte based on measurement signal from at least one sensing site of the plural sensing sites. In some embodiments, this may be based on measurement signals at least two sensing sites of the plurality of sensing sites, in some embodiments all of the plural sensing sites.

In one aspect, there is provided a computer program comprising computer program code which is configured, when said computer program is run on one or more physical computing devices, to cause said one or more physical computing devices to implement the methods disclosed herein.

In one aspect, there is provided one or more non-transitory computer readable media having a computer program stored thereon, the computer program comprising computer program code which is configured, when said computer program is run on one or more physical computing devices, to cause said one or more physical computing devices to implement the methods disclosed herein.

Determination of the Property

The methods, systems and sensor assemblies disclosed herein can be used to determine or measure a property of an analyte in a sample, such as an analyte characteristic. In embodiments, this can be selected from the detection of the presence of the analyte, the concentration of the analyte in the sample, the diffusion constant of the analyte (e.g. rate of diffusion measured in m2/s) in the sample, or a combination thereof. The terms "analyte concentration" or "concentration of the analyte" as used herein may refer to the activity of the analyte. The activity of the analyte may provide a measure of the effective concentration of the analyte.

The analyte may, for example, be selected from a molecular species, a metal ion, a virus, and a microorganism. Biomolecule analytes are particularly useful and may, for instance, be a hormone selected from an eicosanoid, a steroid, an amino acid, amine, peptide or protein.

In embodiments, determination of the property comprises using measurement signals from at least two of the plural sensing sites. That is, at least two of the sensing sites are used to arrive at the determination. This may be directly by using the measurement signals in the calculation of the property (i.e. that the determination is based (at least in part) on the measurement signals from at least two of the sensing sites) or it may be that the measurement signal of at least one sensing site is used to determine which other sensing site will provide the optimal measurement, before the measurement signal from the other sensing site is used in the calculation of the property (only, or together with other sensing site(s)).

Sensor Fusion

Accordingly, in one embodiment, the control unit being configured to use measurement signals from at least two of the sensing sites in determining the property of the analyte comprises: determining a property of the target analyte based on measurement signals from at least two of the plural sensing sites. In an embodiment of the method, determining the property of the analyte using measurement signals from at least two of the plural sensing sites comprises determining a property of the target analyte based on measurement signals from at least two of the plural sensing sites. That is, a measurement signal from at least two different sensing sites is used in the calculation of the property (e.g. concentration) of the target analyte. This sensor fusion increases the accuracy of the measurement since different responses together can be used as a fingerprint.

Correction/Compensation

In one additional or alternative embodiment, the control unit is configured to determine a composite baseline signal based on the measurement signal from at least two of the plural sensing sites in the absence of target analyte on the respective sensing sites; and the control unit is configured to determine a property of the target analyte based on measurement signals from at least one of the plural sensing sites and the composite baseline signal. In one additional or alternative embodiment of the method, determining a composite baseline signal based on the measurement signal from at least two of the plural sensing sites in the absence of target analyte on the respective sensing sites; and determining a property of the target analyte based on measurement signals from at least one of the plural sensing sites and the composite baseline signal. A composite baseline can help to provide a more accurate picture of the contribution of non-specifically bound analyte to the measurement signal, increasing accuracy and sensitivity.

In such embodiments, a baseline signal from at least two of the plural sensing sites can be obtained and combined during the step of determining the property so as to correct or compensate for e.g. baseline noise. This can be used in lieu of or in addition to a control. The composite signal aggregates or combines the signal. This can, in embodiments, comprise measurement of a baseline signal on a first and a second of the plural sensing sites, and comprise determining the property based on a measurement signal from at least one of the first, second sites and/or another of the plural sites (where more than two are present). Thus, the method and system need only have a measurement signal from one sensing site for the determination, but also use measurements from at least one additional sensing site to more accurately determine the property.

Optimisation of a Site

In one embodiment, the control unit being configured to determine the property of the analyte comprises: determining an initial property measurement based on the measurement signal from at least a first sensing site of the plural sensing sites; selecting at least one other sensing site of the plural sensing sites for measurement of the property, based on the initial property measurement; and determining the property of the target analyte based on the measurement signal from the selected at least one other sensing site. In one embodiment of the method, determining the property of the analyte comprises: determining an initial property measurement based on the measurement signal from at least a first sensing site of the plural sensing sites; selecting at least one other sensing site of the plural sensing sites for measurement of the property, based on the initial property measurement; and determining the property of the target analyte based on the measurement signal from the selected at least one other sensing site.

This advantageously can speed up measurement process, provide improved sensitivity and increase the accuracy of the method over existing sensing systems. The initial property measurement can provide an initial indication of the property of the analyte (e.g. the concentration or presence), and this can then be used to determine the optimal sensing site(s) for measurement of the property.

For example, this may enable a sample having an unknown concentration of target analyte to be provided to the sensor assembly. The system may make an initial determination (such as a projection or estimate) of the concentration based on the measurement signal from one or several sites. The sensor assembly can then be reconfigured based on this initial determination or estimate of the concentration to ensure that sample is analysed by the sensing site with a particular (or optimal) operating range of the sensor assembly. For example, this might be an optimised concentration range within which the accuracy of the measurement is higher or may be used to increase the sensitivity of the measurements. This flexibility can allow the sensor assembly to be used with varying concentration ranges without compromising the accuracy of the measurements, for example.

By initial property measurement (or initial indication), it is meant that an initial measurement (determined or estimated) of the property (e.g. concentration). In embodiments, the initial indication may be less accurate or rely on less information than a normal measurement. For example, it may be that the measurement time for the initial determination is quicker than a standard measurement time for a sample. This may be where the concentration is estimated or projected. Alternatively, it may be that the initial measurement is identical to a normal measurement and that it only differs in that the non-initial measurement is carried out under optimal sensor configurations. That is, the initial measurement may use a first sensing site whereas a measurement on which the property determination is based is carried out once the sensor assembly has been configured based on the initial indication (e.g. after the initial measurement has been used to determine the optimal or preferred sensing site).

In one embodiment, the sample may be provided to each of the plural sensing sites and the initial property measurement may be used to determine from which of the sensing sites the measurement signal(s) obtained should be used in the determination of the property. This has the advantage of being quick, as the binding of the target analyte to the capture species on the optimal site (as well as the other sites) is already underway as the initial property measurement is determined. The selection of the sensing site(s) used in the determination is then carried out as a signal processing step (e.g. by the control unit). In other embodiments, the sample may only be provided to the sites from which the measurement signal is used in determination of the initial property measurement, and subsequently sample may be provided to the sites which are to be used in the determination of the property. This may be by a fluid distribution apparatus provided to the system, and may be under the control of the control unit.

Selection of the sensing site(s) for determination of the property based on the initial property measurement can be based on a comparison of the initial property measurement with at least one parameter of the sensing sites. In one embodiment, each of the plural sensing sites has a corresponding limit of detection (LOD) and dynamic range for measuring the property of the target analyte, determined at least in part by the through hole configuration of the respective sensing site; and wherein selecting at least one other sensing site of the plural sensing sites for measurement of the property is based on a comparison of the initial property measurement with the LOD and/or dynamic range of the other of the plural sensing sites. In embodiments of the method, each of the plural sensing sites has a corresponding limit of detection (LOD) and dynamic range for measuring the property of the target analyte, determined at least in part by the through hole configuration of the respective sensing site; and selecting at least one other sensing site of the plural sensing sites for measurement of the property is based on a comparison of the initial property measurement with the LOD and/or dynamic range of the other of the plural sensing sites. LOD as used herein refers to the lower LOD. The LOD may be determined by the point at which the signal-to-noise ratio is 20 dB (i.e. a ratio of 20). The upper LOD may be determined by the saturation point of the sensing site.

For example, the sensor may comprise a first sensing site configured to provide a linear or substantially linear response in a first concentration range of the target analyte and a second sensing site of the plural sensing sites is configured to provide a linear or substantially linear response in a second concentration range of the target analyte, the second concentration range being different to the first concentration range. The control unit is configured to determine the initial property measurement of the target analyte based on a first measurement signal from the first sensing site and subsequently determine whether to use the first sensing site or second sensing site for the target analyte based on the initial property measurement and a comparison of the first concentration range and the second concentration with the initial concentration measurement. This can be a determination whether the initial concentration range falls within either of the first concentration range and the second concentration range, or to which is it the closest (e.g. closest to the mid-point).

This may be a comparison of absolute values or relative values of the sensing sites. For example, it may be that sites are designated as "high" or "low" concentration relative to one another, and a predetermined threshold is used for each. In other examples, each may have a predetermined or determined LOD and dynamic range and there may be a direct comparison of the initial property determination to determine which of these sensing sites is closest to or encompasses the value determined. Where there are plural sites that could be used, this may be determined by the mid-points of ranges, or based on other factors, such as breadth of dynamic range or speed of measurement.

By "dynamic range", it is meant the property range (e.g. concentration range) across which the sensing site can provide a measurable signal. For example, from the lower measurable output (also known as the LOD) to the highest measurable output (which can be set at a particular point for each range, either based on saturation limit or it may be at a predetermined change in response). Each of the plural sensing sites will have a limit of detection (LOD) and dynamic range for measuring the property of the target analyte. In some embodiments, where quantitative measurement is required and the limit of quantitation (LOQ) is different to the LOD, then the range used may be from the LOQ to an upper LOQ. This range is interchangeable with dynamic range herein, such that embodiments may utilise either.

The dynamic range is determined at least in part by the through hole configuration of the respective sensing site. As set out above, the through hole configuration contributes to the sensitivity of the sensing site and thus dynamic range and LOD/LOQ. Given that sensing conditions (e.g. concentration of the analyte in the sample, pH, temperature) will be identical or nearly across the sensing sites, the through hole configuration will provide a large degree of influence on the LOD and dynamic range. In some embodiments, each site comprises the same capture species, for example the same species, amount and density.

It will be appreciated that other factors will also influence the dynamic range, such as amount of the capture species provided on the surface and the size of the sensing site. As noted above, the sensing sites are configured so that the response to the target analyte is different at least in part based on the different in the through hole configuration. That is, there may be contributions from other factors in addition, but the through hole configuration contributes to this different in response. In some embodiments, this different in response may be based entirely or substantially entirely on the difference in through hole configuration. For example, in some embodiments, at least two of the plural sensing sites may be the same size or substantially the same size with the same capture species in the same amount (defined by the density of the capture species on the sensing site and/or the number of sites available for binding the target analyte/unit size). This may be for all of the plural sensing sites. In some embodiments, the different in size and/or density between sites may be less than 10%, such as less than 1%. In some embodiments, the difference in affinities leads to a difference in the shape of the signal plotted over time. This can provide useful information, even where the LOD and dynamic range are substantially similar for different sites.

In one embodiment of the determination of the initial property measurement, the first sensing site has a first dynamic range extending from a lower concentration to an upper concentration, and wherein the respective dynamic range of each of other of the plural sensing site(s) extend from respective lower concentrations and upper concentrations falling between the lower concentration to an upper concentration of the first dynamic range. In other words, the first dynamic range encompasses the dynamic range(s) of the other of the plural sensing site(s). Where there are other plural sensing sites (e.g. the plural sensing sites comprises at least three sensing sites, including the first sensing site), the first sensing site has a dynamic range which Is broader than (i.e. encompasses) the corresponding dynamic range of all of the other of the plural sensing sites. In this way, the first sensing site can be used to provide an initial property measurement across a broad range of concentrations. This initial property measurement can then be used to determine which of the smaller-range other sensing sites, which may provide a higher level of accuracy or a faster response time than the broad range first sensing site, should be used for the determining of the property.

In one embodiment, the first sensing site has a dynamic range having a mid-point $M_1$, and the sensor assembly comprises at least a second sensing site (of the plural sensing sites) having a dynamic range with a mid-point $M_2$ and at least a third sensing site (of the plural sensing sites) having a dynamic range with a mid-point $M_3$, and wherein $M_2 > M_1 > M_3$. In such an embodiment, the sensor assembly thus plural sensing sites in the form of at least three (first, second and third) sensing sites. Each site x has a dynamic range with a midpoint $M_x$, (between the lower limit and the upper limit) where the first sensing site (i.e. the site which is used to determine the initial property measurement) has a midpoint $M_1$ between the mid-point of the second sensing site $M_2$ and that of the third sensing site $M_3$. Typically a dynamic range is more precise in the region at or around the mid-point of the dynamic range where the response of the sensing site tends to be linear or more linear than at the end points. This allows for a range of sensing sites, which in turn can increase the overall dynamic range and performance of the system. In some embodiments, $M_2$ and $M_3$ outside the dynamic range of the first sensing site (i.e. $M_2$ is less than the LOD of the dynamic range of the first sensing site ($LOD_1$). In some embodiments, $M_2$ is less than or equal to $0.25*(M_1-LOD_1)$ and $M_3$ is greater than or equal to $0.75*(M_1-LOD_1)$. In some embodiments, $M_2$ is in the range of from $LOD_1$ to less than $0.5*(M_1-LOD_1)$ and $M_3$ is in the range of from $0.5*(M_1-LOD_1)$ to the upper limit of the dynamic range of the first sensing site. In some embodiments, $M_2$ is in the range of from $LOD_1$ to less than $0.25*(M_1-LOD_1)$ and $M_3$ is in the range of from $0.75*(M_1-LOD_1)$ to the upper limit of the dynamic range of the first sensing site.

In some embodiments, the control unit is configured to determine the property of the target analyte based on the rate of change in a measurement signal of at least one of the plural sensing sites. In some embodiments, the method may comprise determining the property of the target analyte is based on a rate of change in a measurement signal of at least one of the plural sensing sites. These may be based on at least two of the plural sensing, in some embodiments all of the plural sensing sites. Rate of change can help to build up the picture or fingerprint providing a higher degree of accuracy and certainty. Unlike typical electrochemical measurements, the rate of change is particularly beneficial in these methods given the use of several sites interacting with the same target analyte but likely providing a varying response.

Transduction

As set out above, the transducer mechanism(s) used to determine the measurement signal may be any suitable method of transduction. For example, this may comprise measuring the potential (e.g. voltage), current, permittivity, charge, frequency and/or a thermal property. In some embodiments, each sensing site comprises at least one working electrode.

In one embodiment, the sensing element provides a measurement signal indicative of an impedimetric property of the sensing layer; wherein the capture species is located adjacent and/or in the one or more through holes such that target analyte bound to the capture species can interact with the one or more through holes of the sensing layer so as to alter the impedimetric property of the sensing layer; and wherein the control unit is configured to determine the property of the analyte based on the impedimetric property of the sensing layer indicated by the measurement signal. The impedimetric property of the sensing layer (and in some embodiments other components of the sensing element, such as electrodes) is determined by the material properties of the sensing layer and, additionally, any component present in the through hole(s). Prior to interaction of the sensing layer with the sample, the impedimetric property of the sensing layer is determined by the sensing layer and any fluid within the through hole(s). However, once a species is received thereon (e.g. around and/or within the structures), the species will cause a change in this impedimetric property. Depending on the analyte property and its modulation of the signal the property to be measured may be due to double layer change or interruption, sensing layer thickness increase, faradaic or non-faradaic processes, transfer of charge, charge storage, or charge induction. For example, when an analyte is bound to the capture species and can interact with the through hole(s), such as enter and traverse through a through hole, the analyte will contribute to the impedimetric property of the sensing layer. Analytes tend to influence the impedimetric property by a significant margin as compared to a liquid (e.g. a sample matrix) and as such can create a response that is detectable by the system. For example, biomolecules have a permittivity of ~3 compared to a liquid, such as an aqueous solution, which typically have a permittivity of ~80. The response is also one that is directly related to the concentration of analyte (i.e. number of through holes filled and/or to the degree that they are filled), such that this can be used as a qualitative measurement.

In embodiments, the impedimetric property may be selected from a dielectric property (e.g. permittivity), resistance, capacitance, impedance, conductance, or a combination thereof. Depending on the analyte property and its modulation of the signal the property to be measured may be due to double layer change or interruption, sensing layer thickness increase, faradaic or non-faradaic processes, transfer of charge, charge storage, or charge induction. That is, the impedance gives an indication of the opposition to current flow, and this can be influenced by any one of these factors (amongst others). The interaction of an analyte (and the capture species) with the through hole will impact these features and therefore impact the impedimetric property. The changes which occur in the sensing element, particularly the sensing layer, are as a result of interaction with (e.g. occlusion of) the through holes and modulation of electrical phenomena, such as charge transfer, charge induction or current. The systems and methods can therefore determine capacitance, impedance and/or permittivity such that the measurement signal relates to at least one of these, and use this to determine the property of the analyte.

The measurement can be performed using a combination of alternating current (AC) and direct current (DC) and the measurement can be performed at a single frequency or frequency range. In some embodiments, the measurement can be performed using AC measurements. For example, these can enable spectroscopic analysis (e.g. via electrical impedance spectroscopy (EIS)). Such measurements will typically take place over a predetermined frequency range chosen for the particular sensing layer (where the response is effectively linear) and using AC. Measurement of an impedimetric property, such as permittivity, can advantageously be achieved using AC parameters, rather than the traditional DC (only) measurements often used in electrochemical sensing. Use of these parameters over DC measurements alone can advantageously provide a more detailed picture of the response of the interaction with the analyte, and thus provide more information about the analyte itself.

In one embodiment, the impedimetric property is the impedance. This can be converted from measurements of e.g. resistance (the "real" component of the impedance) and reactance (the "imaginary" component of impedance) to capacitance, resistance, impedance, phase angle, using techniques and calculations known in the art.

In one embodiment, the sensing element provides a measurement signal indicative of a dielectric property of the sensing layer; wherein the capture species is located adjacent and/or in the one or more through holes such that target analyte bound to the capture species can interact with the one or more through holes of the sensing layer so as to alter the dielectric property of the sensing layer; and wherein the control unit is configured to determine the property of the analyte based on the dielectric property of the sensing layer indicated by the measurement signal.

In one embodiment, the methods and systems are configured to measure impedance using electrochemical impedance spectroscopy (EIS). The measurement signal can therefore be an AC signal which can be processed to provide data on the analyte. Such a measurement can be limited to small potentials thereby limiting the excitation frequencies where a response is essentially linear, and thus providing a more accurate measurement than can be achieved using DC measurements alone. For example, DC in liquid is limited to a voltage below the water (or carrier) electrolysis voltage. In such an embodiment, this can be achieved by addressing the sensing element, and specifically an electrode of the sensing element, using an AC.

In one embodiment, the system further comprises a heating unit configured to heat the plurality of sensing sites, the sensing element provides a measurement signal indicative of a thermal property of the sensing element; and the control unit is configured to determine the property of the analyte based on the thermal property of the sensing layer indicated by the measurement signal. The heating unit may be under control of control unit, and may in some embodiments include plural heating units, each one associated with a respective sensing site. The capture species may be located adjacent (i.e. next to or abutting) and/or in the one or more through holes such that target analyte bound to the capture species can interact with the one or more through holes of the sensing layer so as to alter the thermal property of the sensing layer. This too provides a responsive means of obtaining a measurement signal since the analyte can have a significant effect on the thermal properties, such as thermal conductivity or heat capacity. Moreover, this, like permittivity, causes a material change in the properties of the sensing layer.

Accordingly, in one embodiment of the method, the measurement signal is indicative of a dielectric property of the sensing layer, the capture species is located adjacent the one or more through holes such that target analyte bound to the capture species can interact with the one or more through holes of the sensing layer so as to alter the dielectric property of the sensing layer; and the step of determine the property of the analyte based on the dielectric property of the sensing layer indicated by the measurement signal. In one embodiment of the method, the sensing element provides a measurement signal indicative of a thermal property of the sensing element; and the method further comprises: heating or cooling the sensing elements; and determining a property of the analyte based on the thermal property of the sensing layer indicated by the measurement signal.

It will be appreciated that cooling may be used instead of heating such that the thermal response to cooling is monitored.

Manipulation

In some embodiments, the system may further comprise a sample manipulation device for manipulating analyte and/or non-analyte species on the sensing element; and the control unit may be configured to operate the sample manipulation device.

In one embodiment, the control unit is configured to operate the sample manipulation device to generate an electric field so as remove any non-specifically-bound analyte and/or non-analyte species but retain specifically-bound analyte on the sensing element (in a "removal step"). The control unit may be configured to determine the property of the analyte based on the measurement signal after the removal step. The control unit may also determine a sample baseline measurement based on the measurement signal before and/or during operation of the sample manipulation device. This can be used in compensating for non-specifically-bound species (e.g. in future measurements) or to determine the parameters for the removal step.

In one embodiment, the control unit is configured to operate the sample manipulation device so as to apply a force to the sample sufficient to move specifically-bound analyte on at least one sensing element (in a "manipulation step") and the control unit is configured to determine the property of the analyte in the sample based on the measurement signal during and/or after the control unit operates the sample manipulation device to move specifically-bound analyte. This may be used on plural sensing sites, where a different response may be seen due in part to the different through hole configurations. In an embodiment, the sample manipulation device is configured to cause specifically-bound analyte on the sensing elements of each of the plurality of sensing sites to enter the one or more through holes of the respective sensing layer.

In one additional or alternative embodiment, the control unit is further configured to operate the sample manipulation device so as to apply a force to the sample sufficient to detach specifically-bound target analyte from at least one of the sensing elements of one of the plurality of sensing sites and thereby detach at least a portion of specifically-bound analyte on the sensing element (in a "detachment step"). This may be used on plural sensing sites, where a different response may be seen due in part to the different through hole configurations. The control unit is configured to determine the property of the analyte in the sample based on the measurement signal during and/or after the control unit operates the sample manipulation device to detach specifically-bound analyte. In some embodiments, the sample manipulation device is configured to cause specifically-bound analyte to detach and pass through the through holes of the sensing layer.

The method may comprise the abovementioned manipulation (removal, manipulation, detachment) steps, in some embodiments, where the steps can be carried out by the control unit or may be carried out by other means.

Manipulation and detachment steps can be used to obtain further information about the analyte, including the interaction of analyte with the through holes of the sensing layers. This can be monitored over time to build up an interaction picture and provide further information on the analyte. For example, the kinetics of movement or the specific interactions could be used as a fingerprint indicative of the presence of the analyte and a quantity of the analyte. For example, the response may vary based on the speed of movement or interaction with the through holes based on the size and nature of the analyte.

In embodiments of the systems and methods disclosed herein, the strength or intensity of the force (e.g. electric field) is varied (e.g. by the control unit). This can be during each of the removal, manipulation and/or detachment steps.

In other words, the strength or intensity of the field providing the force is varied. This will provide a different effect and response than if a single value force is applied and, if measurements are recorded, can generate additional information on the types of non-specific binding or the state of the sensor assembly. For example, force may vary between a minimum and a peak or maximum strength, the peak strength being a strength which is sufficient to remove non-specifically-bound species from at least a portion of the sensing element but has a strength less than that required to detach specifically-bound analytes from the sensing element.

In one embodiment, the sample manipulation device generates an electric field and/or a magnetic field to provide the force. In embodiments, an electric field is used to provide the force for manipulating the species in the sample matrix. That is, it is arranged relative to the sensing element (e.g. adjacent and so that the electric field can influence sample on the sensing element (this may be so that the field overlaps with at least one surface of the sensing element or has sufficient force to create a movement on the surface of the sensing element)) and with the required intensity or strength. For example, in the manipulation step, the field has a strength or intensity that is sufficient to move specifically-bound analyte but less than that required to detach specifically-bound analytes from the sensing element. It will be appreciated that in any of the embodiments mentioned here, although the resultant force of the electric field acting on a particular component (e.g. the analyte or non-analyte species) will depend on a number of factors, including the charge on the component, the magnitude of the force will be determined by the magnitude of the electric field such that a higher V/m value will lead to a greater force acting on the species in the sample. In embodiments, the sample manipulation device comprises a plurality of electrodes configured to apply an electric field about the sensing element.

Embodiments using an electric field in the manipulation and detachment of analyte are particularly advantageous as it provides a synergy with the through holes. The through holes can act as a field confinement feature magnifying the impact of the through holes on the analyte. The through holes provide electric field confinement which increases the strength of the electric field within and adjacent the through holes. This increases the ability of the analyte to interact with the through holes and allows for low voltage sensor systems to create higher strength electric fields than would otherwise be achieved without these types of structure in the sensing layer. Moreover, Different through hole configurations will provide a different effect, and so the response to this force will be different depending on the through hole configuration. For example, it has been found that the dimensions set out above allow for modification of the electric field but without causing significant variations in electric field across the surface of each sensing site.

In embodiments, during a removal step, the voltage across the first electrode and second electrode selected from −750 mV to 750 mV. For example, in certain embodiments, the voltage (i.e. potential difference) can be −500 mV to 500 mV, 0 to 500 mV, or −350 mV to 350 mv, such as 0 to 350 mV. As set out above, this can be at least one discrete value within these ranges, or may comprise a ramp or step through these ranges. Where an electric field is used in a manipulation or detachment step, the voltage used to generate the field may be at least 500 mV, at least 750 mV, at least 1V. For example, where AC is used, this can be from 500 mV to 25 V, such as from 1V to 25V, such as from 1V to 5V. Where DC is used, this can be from 500 mV to 1.5 V.

Detaching the analyte from the capture species (e.g. in a detachment step) or a tag or detection element from the analyte requires a force to be applied which is sufficient to overcome the strength of the interaction between these elements. This force applied will depend on the net electric charge of the species it is acting on, and the force required to detach the relevant species will depend on the interaction between the species, such as strength of the bond. These forces are typically in the range of 10 to 400 pN, such as 30 to 400 pN, such as 30 to 300 pN. Accordingly, in embodiments, during a detachment step, the force applied to the bound analyte is from of 10 to 400 pN. The force applied during the other steps, such as manipulation or removal steps, can accordingly be less than this, such as less than or equal to 50 pN, less than or equal to 40 pN, less than or equal to 30 pN or less than or equal to 10 pN. It will be appreciated that a higher force can be applied during manipulation or removal steps where the binding between the analyte and other species is higher. For example, where a 140 pN force is required to detach an analyte from a capture species, the force applied during manipulation or removal steps may be less than or equal to 100 pN. These forces can be provided by generating an electric field using the voltages mentioned above, for example, particularly in or immediately adjacent the through holes which will provide an electric field concentrating structure (e.g. at the edges of the through holes). As noted above, the force applied will depend on the net electric charge of the species it is acting on. This force applied will depend on the net electric charge of the species it is acting on. For example, in some embodiments, the electric field may require a strength of from $0.5 \times 10^6$ V/m to $1 \times 108$ V/m, such as $1 \times 10^6$ V/m to $2 \times 10^7$ V/m. This may be present in the localised regions around the through holes and need not be throughout the entire applied field.

FIG. 1 schematically depicts a system 100 for determining the concentration of a target analyte 2 according to an embodiment and FIGS. 2A and 2B schematically depict a sensor assembly 105 used in the system 100 of FIG. 1. FIG. 2A shows a schematic plan view of the sensor assembly 105, which comprises a substrate 106, a first sensing site 110A, a second sensing site 110B, a third sensing site 110C and a track 115. FIG. 2B shows a schematic cross-sectional view of the sensor assembly 105 through a plane dissecting the first sensing site 110A, second sensing site 110B and third sensing site 110C.

Specifically, the system 100 comprises the sensor assembly 105, a signal processing unit 150 and a processor which acts as the control unit 160 and which is used to determine the concentration of the target analyte 2 in the sample.

Specifically, the sensor assembly 105 comprises a sensing element comprising plural sensing sites in the form of the first sensing site 110A, second sensing site 110B and third sensing site 110C. Each of the sensing sites 110A-110C are formed of an individually addressable electrode forming a sensing layer functionalised with a capture species 120 and comprising one or more through holes 120A, 120B, 120C. The first sensing site 110A comprises plural through holes 130A with a first through hole configuration and provides a first measurement signal indicative of the interaction of the first sensing site 110A with the target analyte 2. The second sensing site 110B comprises a plural through holes 130B in a second through hole configuration and provides a second measurement signal indicative of the interaction of the second sensing site 110B with the target analyte 2. The third sensing site 110C comprises one through hole 130C in a third through hole configuration and provides a third measurement signal indicative of the interaction of the third sensing site 110C with the target analyte 2.

Each of the first, second and third through hole configurations on each of the first, second and third sensing sites 110A-110C, respectively, is different to the other sites such that each will provide a different response to the target analyte 2. In this embodiment, the capture species is the same on each. Each of the first, second and third sensing sites 110A-110C are electrically connected to the signal processing unit 150 and control unit 160 by track 115 so that the respective first, second or third measurement signal can be obtained by the signal processing unit 150.

In use, one general embodiment of the use of the system 100 comprises providing a sample with an unknown concentration of the target analyte 2 to the sensor assembly 105. This may comprise providing the sample to each of the first, second and third sensing sites 110A-110C simultaneously or may comprise providing sample to only one of the first, second and third sensing sites 110A-110C (e.g. at one time). The method further comprises obtaining at least one of the first, second and/or third measurement signals and subsequently determining a property of the target analyte 2 based on at least one of the first, second and/or third measurement signals. As the target analyte 2 reaches the surface of each of the first, second and third sensing sites 110A-110C, it will interact with capture species 120. However, in view of the different through hole configurations, the speed and nature of the binding of the target analyte to the capture species of each will be different, at least in part due to field confinement within the through holes 130A-130B and hence each of the first, second and third sensing sites 110A-110C will produce a different response in the presence of the analyte.

Two further methods of using the system 100 of FIG. 1 and the sensor assembly 105 of FIGS. 1A and 1B will now be described.

The control unit 160 is configured to use at least two of the first, second and third measurement signals from at least two of the first, second and third sensing sites 110A-110C.

In use, one embodiment of the use of the system 100 comprises providing a sample with an unknown concentration of the target analyte 2 to the sensor assembly 105. In this embodiment, the sample may be provided to each of the first, second and third sensing sites 110A-110C simultaneously. As the target analyte 2 reaches the surface of each of the first, second and third sensing sites 110A-110C, it will interact with capture species 120. However, as noted above, in view of the different through hole configurations, each of the first, second and third sensing sites 110A-110C will produce a different response in the presence of the analyte.

In this embodiment, the control unit 160 is configured to cause the signal processing unit 150 to interrogate the first, second and third sensing sites 110A-110C providing first, second and third measurement signals, respectively. Each of the signals is indicative of the binding and make be taken over a predetermined time period, until it is deemed that a sufficient response has been obtained (indicative of a sufficient degree of binding) or until equilibrium is reached.

In this embodiment, the control unit 160 determines the concentration of the target analyte 2 in the sample by using the first, second and third measurement signals from the first, second and third sensing sites 110A-110C, respectively. As each provides a different measurement signal, the fusion of the three signals increases the accuracy of the measurement. For example, each of the first, second and third measurement signals will provide a different response which together will create a unique signature for the particular analyte concentration. This signature is confirmed or created by the use of plural measurement signals. Moreover, the measurement signal from at least two of the first, second and third sensing sites 110A-110C in the absence of binding between the target analyte and the capture species 120 can be used to generate a measurement of the background and be used in a compensation step for correcting or adjusting the signal for the background.

In one embodiment of this method, the through holes configurations are such that each of the first, second and third sensing sites 110A-110C has a different dynamic range (i.e. ranging from a lower LOD to an upper LOD, where the lower and upper LODs are defined by the point at which the signal-to-noise ratio is 20:1). In this case, the first sensing site 110A has a dynamic range with a midpoint M1, the second sensing site 110B has a dynamic range with a midpoint M2 and the third sensing site 110C has a dynamic range with a midpoint M3, where M2<M1<M3. This means that the responses across each of the sensing sites 110A-110C will be different, and some may be more accurate than others at particular concentration ranges. The through hole configuration of each of the first, second and third sensing sites 110A-110C in this embodiment have been selected such that there is overlap of dynamic ranges between at least two of the sites.

In the context of this method, as the target analyte 2 is provided to the first, second and third sensing sites 110A-110C, the first, second and third measurement signals will provide a response, depending on what the concentration is. In the case of a concentration which falls within a concentration which is within the dynamic ranges of the first sensing site 110A and the second sensing site 110B, the control unit 160 may be configured to determine the concentration using the first and second measurement signals (only). Combining these signals will provide improved accuracy over the use of just one. In some embodiments, the third sensing site 110C could be used as a pseudo-control or a control. Similarly, should the concentration of the target analyte 2 be within the dynamic ranges of the first and third sensing sites 110A, 110C, then the control unit may be configured to determine the concentration using the first and third measurement signals (only).

It will be appreciated that the through hole configurations and the configuration of the sensing sites 110A-110C (e.g. density of capture species and size of sensing site) may be selected so to have different degrees of overlap or coverage of an overall sensor assembly dynamic range (i.e. a composite dynamic range provided by the three sensing sites 110A-110C as a whole). For example, it may be that more substantial overlap between the dynamic ranges of the first, second and third sensing sites 110A-110C is required. Where the target analyte 2 has a concentration falling within the middle of the dynamic range of the sensor assembly 105 as a whole, the presence of the target analyte 2 could then be detected on each of the sensing sites 110A-110C such that the determination of the property can be based on the first, second and third measurement signals together. The former configuration may be advantageous in situations where the target analyte 2 may be found over a greater concentration range in the samples. The latter configuration may be advantageous in situations where the target analyte 2 may be found in a narrower concentration range but the accuracy of the measurement is particularly important. Both provide significant advantages over sensor assemblies employing only one sensing site.

In use, in another embodiment of the system 100 and method, active feedback is used whereby the system 100 is used to obtain an initial measurement of the concentration, and the control unit 160 determines the optimal configuration of the sensor assembly 105 for the concentration detected in the initial measurement.

In particular, the sample is provided to the first sensing site 110A and the control unit 160 determines an initial property measurement based on the first measurement signal from the first sensing site 110A. This can be taken over a predetermined time period, until it is deemed that a sufficient response has been obtained (indicative of a sufficient degree of binding) or can be until equilibrium is reached.

The control unit 160, based on the initial property measurement, selects at least one of the second sensing site 110B and third sensing site 110C to use as the basis for the determination of the concentration. As the second sensing site 110B and third sensing site 110C each have different through hole configurations, the response from each of the second and third sensing sites 110B, 110C will be different and different to the first sensing site 110A. The control unit 160 in this embodiment determines which of the second and third sensing sites 110B, 110C should be used to measure the concentration, which can be based on the dynamic sensing ranges of second and third sensing sites 110B, 110C. The control unit 160 is further configured to determine the concentration of the target analyte 2 in the sample based on the second and/or third measurement signals from the second and/or third sensing sites 110B, 110C. This creates a sensor assembly 105 which is versatile can be optimised on-the-fly to adapt to the specific sample.

In one embodiment of this method, the sample may be provided to each of the first, second and third sensing sites 110A-110C simultaneously, or at least prior to the selection of a measurement signal for the determination of the concentration. In this way, selection of the measurement signal can be carried out as a processing step (e.g. by the control unit) rather than requiring subsequent manipulation of the sensor assembly 105 and/or sample. In other embodiments, the initial property determination may be made prior to obtaining the selected measurement signal. In other words, prior to addressing the second or third sensing site 110B, 110C or even prior to providing the sample to the second and/or third sensing site 110B, 110C (e.g. by a fluidic distribution system or by a user). This can be advantageous in some systems as the provision of this optimization functionality at device level can reduce the reliance on associated electronics to provide improved accuracy and sensitivity (e.g. a dynamic sensing range).

Figures 3, 4A:
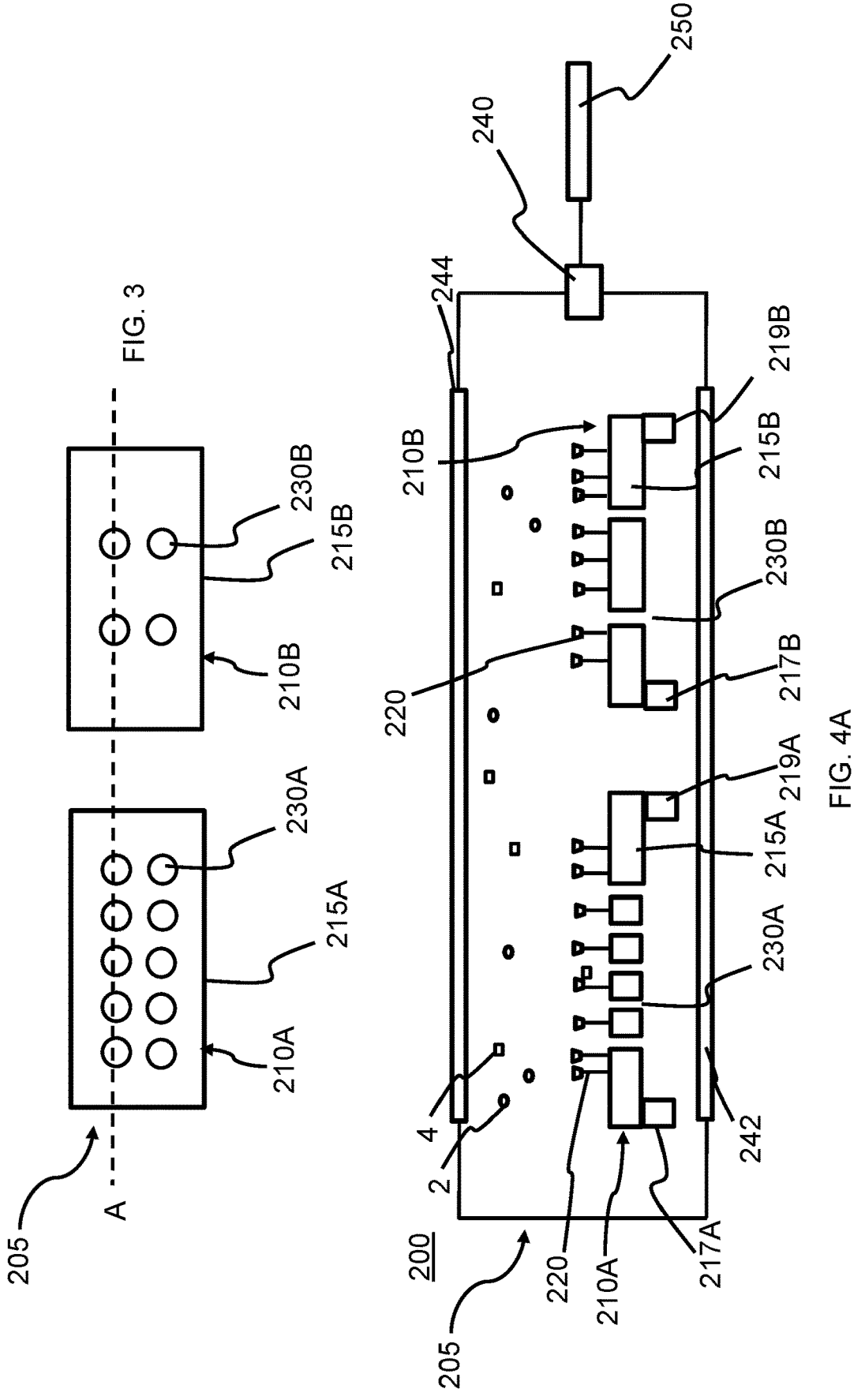
FIG. 3 provides a schematic plan view of a sensor assembly according to an embodiment.
FIGS. 4A to 4E provide a schematic cross-sectional view of a system according to an embodiment and which includes the sensor assembly of FIG. 3.

FIG. 3 schematically depicts a sensor assembly 205 and FIGS. 4A to 4E schematically depict a system 200 comprising the sensor assembly 205, the system being for determining a property of an analyte 2 in a sample, the sample comprising the analyte 2, non-analyte species 4 and a sample matrix in which the analyte 2 and non-analyte species 4 are contained. FIG. 3 provides a schematic plan view of the sensor assembly 205 and FIGS. 4A to 4E provide a schematic cross-sectional view of the system 200, including the sensor assembly 205 along line A shown in FIG. 3. It will be appreciated that the schematic drawings are provided to exemplify the concepts provided herein and the components, such as the through holes and capture species, are not intended to be to scale.

The system 200 comprises a sensor assembly 205 comprising a sensing element formed of a first sensing layer 215A providing a first sensing site 210A and a second sensing layer 215B providing a second sensing site 210B. The first sensing site 210A comprises an array of through holes 230A having a first through hole configuration. The second sensing site 210B comprises an array of through holes 230B having a second through hole configuration. The sensing layers 215A, 215B are suspended in a chamber such that fluid resides on both sides of the sensing layers 215A, 215B and with the through holes 230A, 230B providing for passage of fluid from the region above the sensing layers 215A, 215B to below the sensing layers 215A, 215B. The sensing layers 215A, 215B are both functionalised with the same capture species 220, which is configured to specifically bind with the analyte provided on the upper surface of each sensing layer 215A, 215B adjacent the through holes 230A, 230B.

In this embodiment, the through holes 230A, 230B of the first and second sensing sites 210A, 210B are substantially identical in dimensions (depth and width) but differ in the number of through holes 230A, 230B and the spacing along one axis. In particular, the first sensing site 210A comprises ten through holes 230A in an array comprising two rows of five through holes 230A and the second sensing site 210B comprises four through holes 230A in an array comprising two rows of two through holes 230A. Without wishing to be bound by theory, the inventors have discovered that changing the spacing can change the response of the respective sensing site to a target analyte 2. The remaining properties (materials, sensing site size, capture species, and number and density of capture species) are substantially identical on both of the first and second sensing sites 210A, 210B.

The sensor assembly 205 also comprises a means for interrogating each of the sensing sites 210A, 210B formed from a first electrode 217A, 217B and a second electrode 219A, 219B. These interrogate the sensing layer 215A, 215B of each sensing site 210A, 210B to determine a property of the respective sensing layer 215A, 215B. Specifically, the first electrode 217A of the first sensing site 210A is provided beneath and along one edge of the first sensing layer 215A. The second electrode 219A of the first sensing site 210A is provided beneath and along the opposite side of the first sensing layer 215A. These connect to a signal processing unit and can be interrogated to provide a first measurement signal. Similarly, the first electrode 217B of the second sensing site 210B is provided beneath and along one edge of the first sensing layer 215B. The second electrode 219B of the second sensing site 210B is provided beneath and along the opposite side of the first sensing layer 215B. These connect to a signal processing unit and can be interrogated to provide a second measurement signal.

The system 200 in the form set out above can be used to advantageously determine the property of the analyte 2, as set out above, but may further comprise additional components to assist this measurement and/or improve the accuracy.

In this embodiment, the system 200 further comprises a sample manipulation device 240 which is for manipulating analyte 2 and/or non-analyte species 4 in the sample matrix (e.g. on the first and second sensing sites 210A, 210B). The sample manipulation device 240 comprises a first manipulation electrode 244 provided above the first and second sensing layers 215A, 215B and a second manipulation electrode 242 electrically connected to the first manipulation electrode 244 and located below the first and second sensing layers 215A, 215B. These are separate to the electrodes 217A, 217B, 219A, 219B used to interrogate the first and second sensing layers 215A, 215B. The first manipulation electrode 244 and second manipulation electrode 242 are configured to apply an electric field through the sample matrix and about the first and second sensing layers 215A, 215B so that movement of the analyte 2 and non-analyte species 4 within the sample matrix can be controlled by the electric field generated therebetween. Specifically, the arrangement of the first and second manipulation electrodes 244, 242 above and below the sensing layer 215 permits movement substantially perpendicular to the upper and lower surfaces of first and second sensing layers 215A, 215B and in a direction through the through holes 230A, 230B. This enables movement from one side of first and second sensing layers 215A, 215B to the other side, for example.

The system 200 further comprises a control unit 250 which is a processor configured to operate the sample manipulation device 240. Specifically, the control unit 250 is configured to operate the sample manipulation device 240 to generate the electric field using the first and second manipulation electrodes 244, 242. The control unit 250 is further configured to determine the property of the analyte based on the measurement signal obtained from first and second sensing layers 215A, 215B.

Figures 4B, 4C:
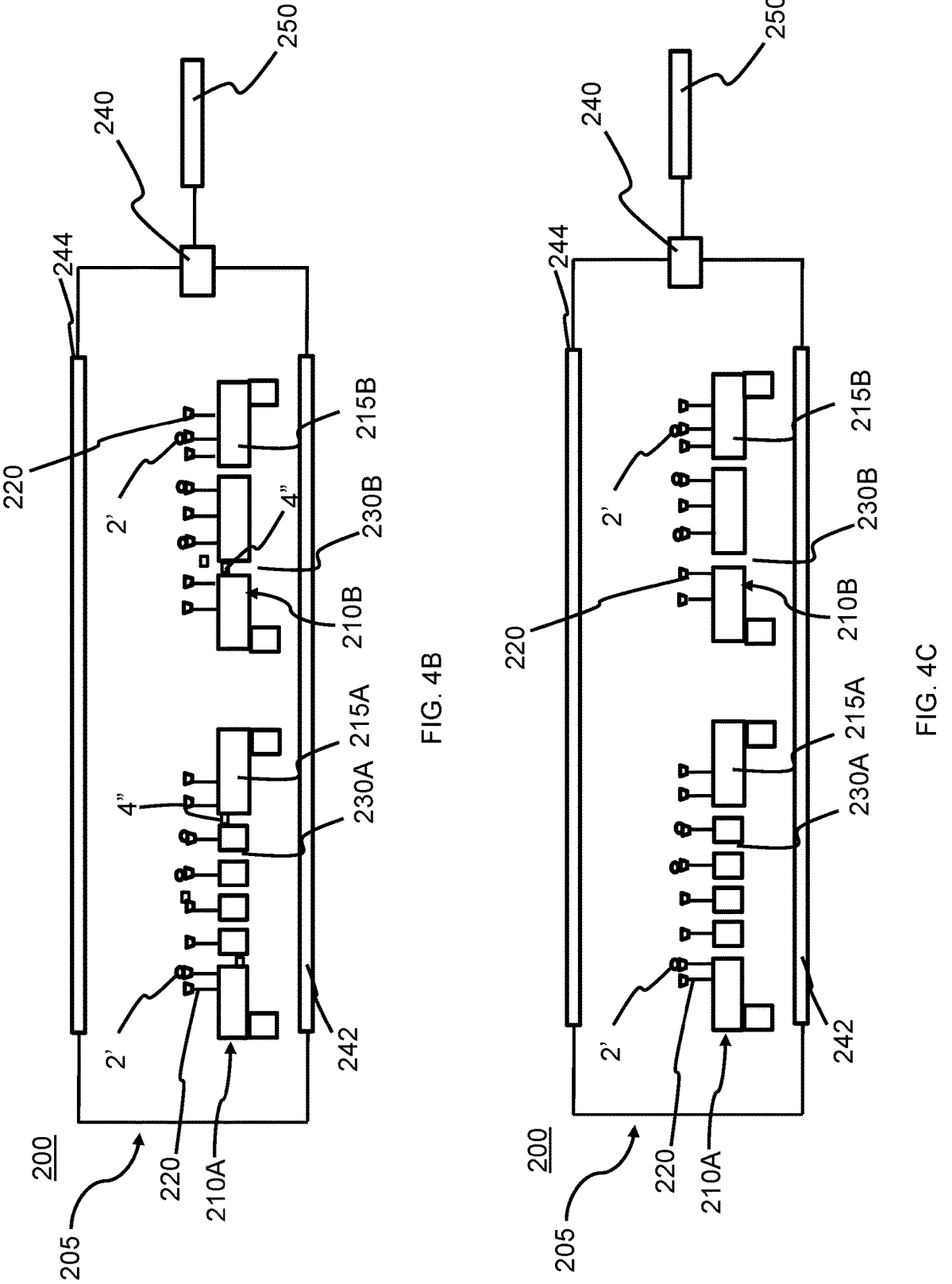

In use, analyte 2 provided to the system 200 will specifically bind to the capture species to form specifically-bound analyte 2', as depicted in FIG. 4B. Non-analyte species 4 may non-specifically bind to sensing layer 215 to form non-specifically-bound non-analyte species 4". Although the main interaction of interest is that between the capture species 220 and the analyte 2, which will contribute to a response in the measurement signal, the non-specific binding of the species will also contribute to the signal. This interaction can reduce the sensitivity of the measurement and slow down the measurement process. In some cases, non-specific binding can lead to sensor failure. Accordingly, in some embodiments, a method may comprise removing at least a portion of the non-specifically-bound non-analyte species 4" from the sensing element by applying an electric field to the sample matrix (in a "removal step"). The electric field in system 200 is formed using the sample manipulation device 240 under the action of the control unit 250.

This removal step causes removal of non-specifically-bound analyte and/or non-analyte species from at least a portion of the sensing element by providing a force which acts on the species driving them away from one of the first and second manipulation electrodes 244, 242 and towards the other. In one implementation depicted in FIG. 4C, the electric field is configured to move the species towards the second manipulation electrode 242, and as such the species move from the region above the upper surface of the sensing layer 215 to the region below the lower surface of the sensing layer 215. This can also lead to passage through the through holes 230. During this step, the electric field is applied with a strength that is less than that required to detach specifically-bound analyte 2' from the sensing layer 215. This can be determined based on strength of the interaction (affinity) between the capture species 220 and the analyte 2.

The removal step accordingly strips away the non-specifically-bound species (analyte 2', non-analyte species) 4" from the sensing layer 215 leaving behind specifically-bound analyte 2' on the surface. In this way, the contribution of the non-specifically-bound species to the measurement signal is eliminated or at least reduced, thereby improving the accuracy of the measurement overall.

The method can therefore further comprise determining the property of the analyte in the sample 290 based on the first and/or second measurement signal(s) after the removal step 288. The first and second measurement signals are indicative of a material property of the first and second sensing layers 215A, 215B, respectively. For example, permittivity or thermal properties. In the method, prior to interaction of the first and second sensing layers 215A, 215B with the sample, the permittivity of each of the first and second sensing layers 215A, 215B is determined by the properties of the first and second sensing layers 215A, 215B and any fluid within the through holes 230A, 230B. In the case of permittivity, for example, a liquid (such as an aqueous solution) will typically have a permittivity of ~80. However, once analyte 2 is bound to the capture species 220 and can interact with the through holes 230A, 230B, such as enter and traverse through, the analyte 2 (and potentially the capture species 220) will contribute to the dielectric property of the first and second sensing layers 215A, 215B. The permittivity of analyte species such as biomolecules tends to be over an order of magnitude less (e.g. 3-5) such that this results in a measurement signal that can be detected. This can be detected by addressing the electrodes 217A, 217B, 219A, 219B with an AC across a particular frequency range, for example.

Moreover, because of the difference in the through hole configuration of the first and second sensing layers 215A, 215B, each of the first and second measurement signals will be different, particularly over time as the interactions occur. This can be used to more accurately determine the property of the analyte.

Figures 4D, 4E:
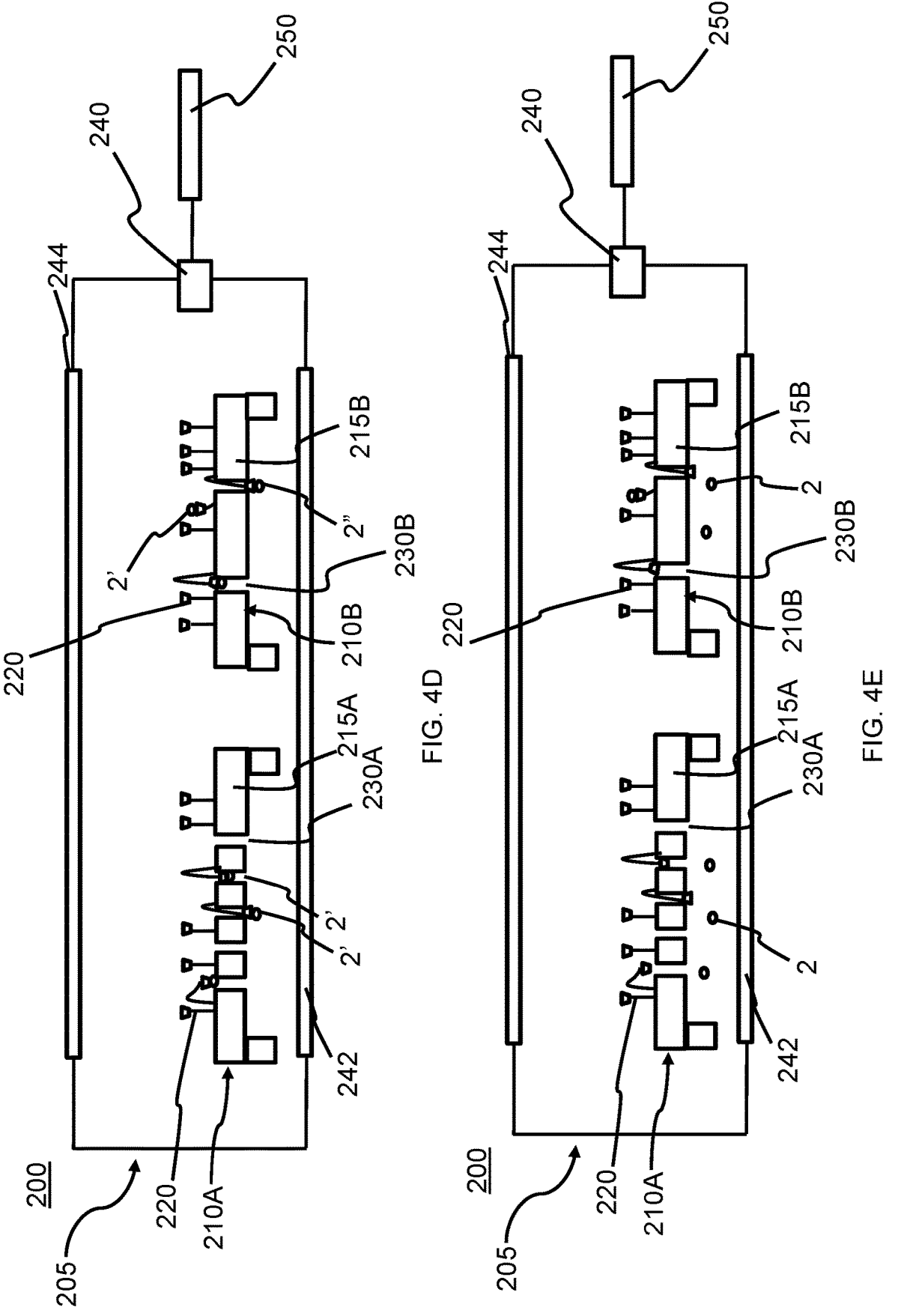

In some embodiments, the method further comprises manipulating at least a portion of the specifically-bound analyte ("manipulation step") after the removal step. In this embodiment, the electric field generated between the first and second manipulation electrodes 244, 242 has a higher strength than in the removal step so that there is movement of the specifically-bound analyte on the first and second sensing layers 215A, 215B. Due to the configuration of the system 200, this movement can move the specifically-bound analyte 2' into the through holes 230A, 230B and, depending on the length and position of the capture species, in some embodiments through the through holes 230A, 230B, as depicted in FIG. 4D.

This manipulation step will generate specific responses and change in the response of the sensing element (i.e. the measurement signal). This can be monitored over time to build up an interaction picture and provide further information on the analyte. For example, the kinetics of movement or the specific interactions could be used as a fingerprint indicative of the presence of the analyte and a quantity of the analyte. For example, the response may vary based on the speed of movement or interaction with the through holes 230A, 230B based on the size and nature of the analyte 2 and the through hole configuration. In this case, the interaction will be different depending on the through hole configuration such that the response will be different.

In some embodiments, determining the property of the analyte is based on the rate of change in the measurement signal during the step of manipulating the specifically-bound analyte. This can help to build up the picture or fingerprint providing a higher degree of accuracy and certainty. Unlike typical electrochemical measurements, the rate of change is particularly beneficial in these methods given the manipulation of the analyte and therefore the varying response, which in turn will vary with the different through hole configurations.

The method in this embodiment further comprises detaching at least a portion of the specifically-bound analyte ("detachment step") after the removal step. Detaching specifically-bound analyte comprises applying a force to the sample matrix sufficient to detach specifically-bound analyte from the sensing element, which in this is achieved by further increasing the strength of the electric field provided by the sample manipulation device 240 to a strength that overcomes the affinity between the capture species 220 and the analyte 2.

FIG. 4E shows the result of the detachment step. Due to the specific electric field applied, movement of the analyte 2 from the first manipulation electrode 244 to the second manipulation electrode 242 occurs such that the analyte passes through the through holes 230A, 230B and to the underside of each of the first and second sensing layers 215A, 215B. The method accordingly further comprises determining the property of the analyte in the sample based on the measurement signal during and/or after the detachment step.

Figures 5A, 5B, 6:
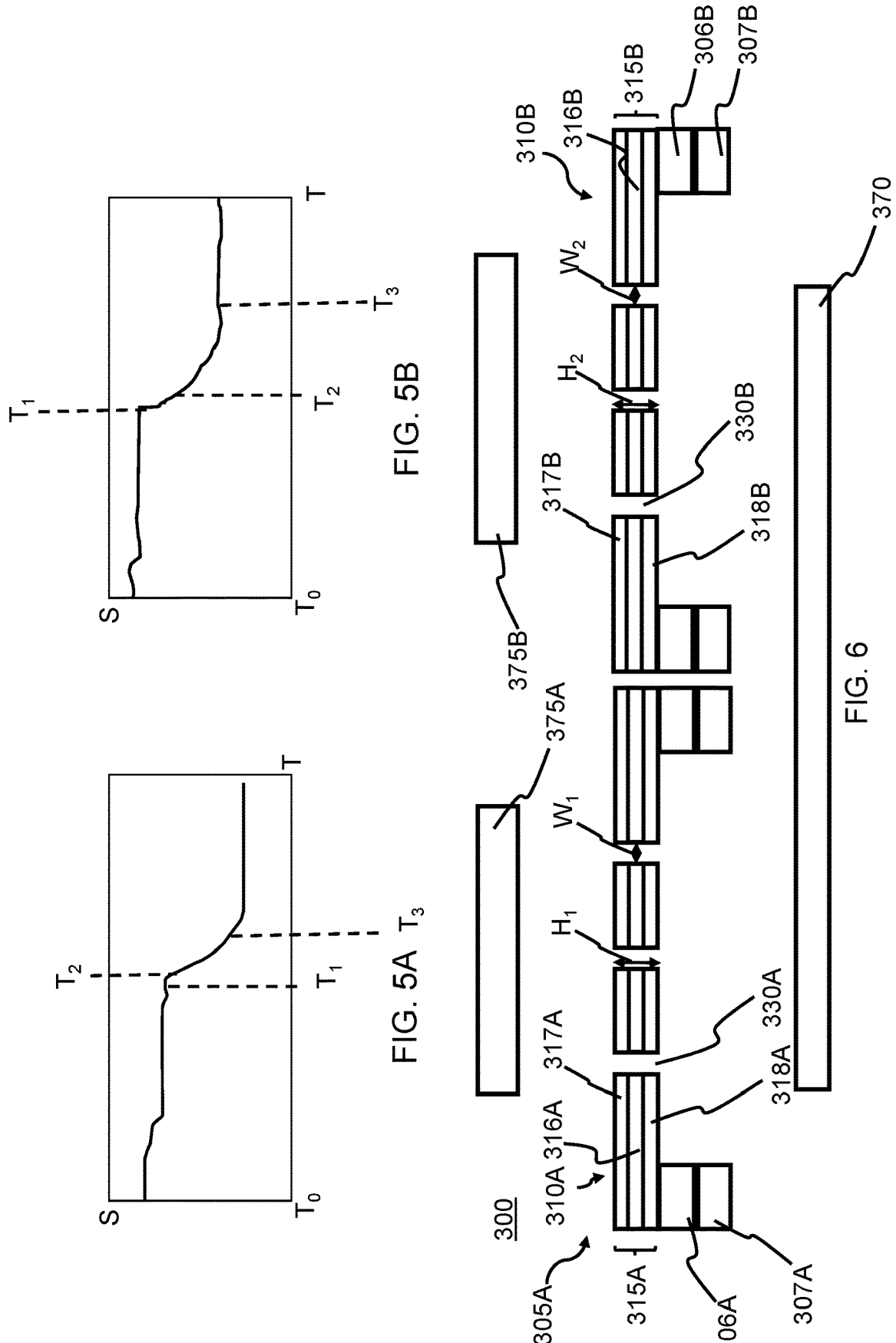
FIGS. 5A and 5B provides a schematic graph plotting signal (S) against time (T) for the sensor assembly according to FIG. 3.
FIG. 6 provides a schematic cross-sectional view of a system according to an embodiment.

FIGS. 5A and 5B depicts a graph showing an example signal(S) corresponding to the configurations shown in FIGS. 4A to 4D, plotted against time (T), for each of the first and second sensing layers 215A, 215B, respectively, during the manipulation and detachment steps set out above.

Each shows an initial configuration in which the signal(S) is at a baseline between $T_0$ and $T_1$ corresponding to the response associated with the bound analyte 2'. As the electric field is applied, the bound analyte 2' is driven towards the respective first or second sensing layer 215A, 215B but does not yet enter the respective through holes 230A, 230B. This causes a change in signal between $T_1$ and $T_2$, as depicted. As the electric field is further applied, bound analyte 2' is driven through the respective through holes 230A, 230B. When the bound analyte 2' is located within the through holes 230A, 230B, this causes a large change in the dielectric property of the respective first and second sensing layers 215A, 215B. This in turn causes a large change in signal (e.g. between $T_2$ and $T_3$). Finally, as the bound analyte 2' exits the respective through holes 230A, 230B on the other side, the signal levels out with a new baseline (corresponding to the signal with the analyte 2 through the through holes 230A, 220B). The rate of change and difference in signals before and after the manipulation process can all provide data used to confirm the presence and amount of an analyte. Moreover, each of the first and second sensing layers 215A, 215B provides a different response and hence the signal S for each is different.

FIG. 6 schematically depicts a cross-section through a system 300 comprising a sensor assembly 305. The sensor assembly 305 comprises plural sensing sites in the form of a first sensing site 310A and a second sensing site 310B. The first sensing site 310A comprises a first sensing layer 315A which is formed of a base sensing layer 318A, on top of which is formed an electrode 316A and on top of which is formed a passivation layer 317A providing the upper surface of the sensing layer 315A. The electrode 316A is accordingly embedded within sensing layer 315A. The first sensing site 310A also comprises a plurality of through holes 330A extending from an upper surface of the passivation layer 317A to the lower surface of the base sensing layer 318A forming the bottom layer of the sensing layer 315A. In this embodiment, the first sensing layer 315A is suspended in a fluid chamber such that fluid resides on both sides of the first sensing layer 315A by elevating the sensing layer 315A on supports 306A, in this case an oxide layer, which oxide layer is formed on silicon 307A. Such sensor assemblies 305 can advantageously be formed using traditional CMOS manufacturing techniques. The electrode 316A in this embodiment can be an interdigitated electrode, with interlaced fingers located around the through holes 330A.

The second sensing site 310B comprises a similar structure, with a second sensing layer 315B formed of a base sensing layer 318B, on top of which is formed an electrode 316B and on top of which is formed a passivation layer 317B. The first sensing site 310B also comprises a plurality of through holes 330B extending from an upper surface of the passivation layer 317B to the lower surface of the base sensing layer 318B. The second sensing layer 315B is also suspended in a fluid chamber on supports 306B, in this case an oxide layer, which oxide layer is formed on silicon 307B. The electrode 316B in this embodiment can be an interdigitated electrode, with interlaced fingers located around the through holes 330B.

The passivation layers used 317A, 317B provides a surface which is more straightforward to functionalise and which can be used to limit interaction of the electrodes 316A, 316B with species on the upper surface of the respective first and second sensing layers 315A, 315B, thereby focusing the signal changes on interaction with the through holes 330A, 330B.

In this embodiment, the through hole configuration of the first and second sensing sites 310A, 310B differs in the depth and width of the through holes. The number and density remain the same. However, the first sensing site 310A has through holes 330A with height $H_1$ and width $W_1$. In contrast, the second sensing site 310B has through holes 330B with height $H_2$ and width $W_2$, where $H_2 < H_1$ and $W_2 < W_1$. This provides a different response in the presence of analyte.

One exemplary means of transducing a signal is determining the thermal properties of the first and second sensing layers 315A, 315B. In this embodiment, the system 300 further comprises a heating unit 370 provided below the first and second sensing layers 315A, 315B which is adapted to provide heat to both of the sensing sites 310A, 310B. A first heat flux sensor 375A is provided above the first sensing layer 315A and a second heat flux sensor 375B is provided above the second sensing layer 315B. Each of the first and second heat flux sensors 375A, 375B can provide a thermal measurement signal indicative of a thermal property (e.g. based on heat flux through) of the first and second sensing layers 315A, 315B, which is affected by material within the through holes 330A, 330B of each of the first and second sensing layers 315A, 315B.

In one particular example based on the system 300, the system 300 can be used for performing an ELISA assay. The structure used in this particular example can comprise a silicon oxide supports 306A, 306B with a thickness of 1-2 μm. The passivation layers 317A, 317B are each a 70 nm thick passivation layer. The electrodes 316A, 316B are each 50 nm thick titanium nitride (TiN) layer. The first sensing layer 315A is a 100 nm silicon nitride ($Si_3N_4$) dielectric layer and the second sensing layer is a 200 nm silicon nitride dielectric layer. This creates a total depth of each first through hole 330A (i.e. $H_1$) of 220 nm and the total depth of each second through hole 330B (i.e. $H_2$) of 320 nm. The first through holes 330A have a diameter ($W_1$) of 400 nm and the second through holes 330B have a diameter ($W_2$) of 600 nm. These dimensions provide through holes 330A, 330B which are responsive to ELISA structures. For example, the capture antibody can have a length of 10-15 nm and it may use a detection antibody provided with a double-stranded DNA of ~300 nm long, with a 2 nm diameter (900 base pairs).

Figure 7:
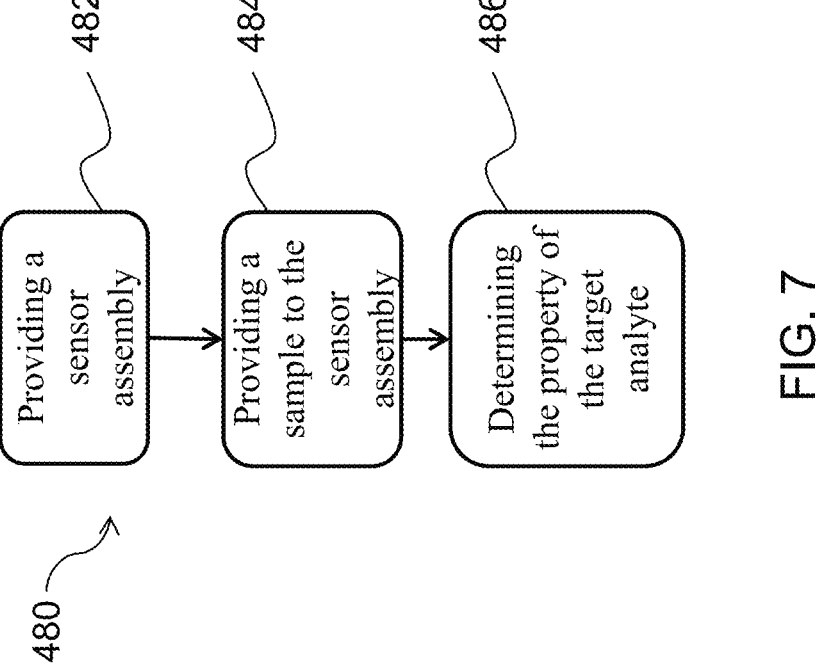
FIG. 7 depicts a method according to an embodiment.

FIG. 7 schematically depicts a method for determining a property of target analyte in a sample 480, according to an embodiment. The method comprises:

First, providing a sensor assembly 482, the sensor assembly comprising plural sensing sites, each of the sensing sites comprising a sensing element, the sensing element comprising a sensing layer comprising an upper surface and a lower surface and one or more through holes, each of the one or more through holes extending from the upper surface to the lower surface and a capture species configured to specifically bind with a target analyte provided to the sensing layer. Each sensing element provides a measurement signal indicative of the interaction of the target analyte with the sensing layer. Each sensing site has a through hole configuration corresponding to a property of the one or more through holes, and wherein the through hole configuration of each sensing site is different.

Subsequently, providing a sample to the sensor assembly 484 and determining the property of the target analyte 486 based on measurement signal from at least one sensing site.

It should be understood that the detailed description and specific examples, while indicating exemplary embodiments of the apparatus, systems and methods, are intended for purposes of illustration only and are not intended to limit the scope. These and other features, aspects, and advantages of the apparatus, systems and methods of the present invention can be better understood from the description, appended claims or aspects, and accompanying drawings. It should be understood that the Figures are merely schematic and are not drawn to scale. It should also be understood that the same reference numerals are used throughout the figures to indicate the same or similar parts.

Other variations to the disclosed embodiments can be understood and effected by those skilled in the art in practicing the disclosure, from a study of the drawings, the disclosure, and the appended aspects or claims. In the aspects or claims, the word "comprising" does not exclude other elements or steps, and the indefinite article "a" or "an" does not exclude a plurality. The mere fact that certain measures are recited in mutually different dependent aspects or claims does not indicate that a combination of these measures cannot be used to advantage. Any reference signs in the claims should not be construed as limiting the scope.

Aspects of the invention will now be set out:

Aspect 1. A sensor assembly for a target analyte, comprising: a plurality of sensing sites, each sensing site comprising: a sensing element, the sensing element comprising a sensing layer comprising an upper surface and a lower surface and one or more through holes, each of the one or more through holes extending from the upper surface to the lower surface; and a capture species configured to specifically bind with a target analyte provided to the sensing layer, wherein each sensing element provides a measurement signal indicative of the interaction of the target analyte with the sensing layer; and wherein each sensing site has a through hole configuration corresponding to a property of the one or more through holes, and wherein the through hole configuration of each sensing site is different.

Aspect 2. The sensor assembly of aspect 1, wherein the property of the one or more through holes comprises the number, dimensions and/or arrangement of the one or more through holes.

Aspect 3. The sensor assembly of aspect 1 or aspect 2, wherein the property of the one or more through holes comprises: the dimensions of the one or more through holes of each of the plurality of sensing sites, the dimensions being selected from the depth or largest diameter of the one or more through holes; or the arrangement of the one or more through holes of each of the plurality of sensing sites selected from density of the one or more through holes per unit area of sensing site, spacing between the through holes and/or relative position of the through holes.

Aspect 4. The sensor assembly of any preceding aspect, wherein the one or more through holes of each of the plurality of sensing sites have a largest diameter of less than or equal to 2 µm and a depth of less than or equal to 2 µm.

Aspect 5. The sensor assembly of any preceding aspect, wherein the one or more through holes of each of the plurality of sensing sites have a largest diameter of from 50 nm to 1 µm.

Aspect 6. The sensor assembly of any preceding aspect, wherein the one or more through holes of each of the plurality of sensing sites have a depth of from 100 nm to 2 µm.

Aspect 7. The sensor assembly of any preceding aspect, wherein at least one sensing site comprises a plurality of through holes, wherein the through holes are spaced apart by at least 500 nm.

Aspect 8. The sensor assembly of any preceding aspect, wherein each sensing site comprises a plurality of through holes having a largest diameter of less than or equal to 1000 nm and a depth of from 100 nm to 2 µm and wherein the through holes on each of the sensing sites are spaced apart by a spacing of from 2 µm to 6 µm.

Aspect 9. The sensor assembly of any preceding aspect, further comprising a fluid chamber for receiving a sample, wherein each sensing layer is arranged in the fluid chamber such that sample can reside above the upper surface, reside below the lower surface and pass through the through holes in the sensing layer.

Aspect 10. A system for determining a property of a target analyte in a sample, the system comprising: a sensor assembly according to any preceding aspect; and a control unit configured to determine the property of the analyte, wherein the control unit is configured to determine the property of the analyte based on a measurement signal from at least one sensing site of the plural sensing sites.

Aspect 11. The system of aspect 10, wherein the control unit is configured to determine the property of the target analyte based on measurement signals from at least two sensing sites of the plurality of sensing sites.

Aspect 12. The system of aspect 10 or aspect 11, wherein the sensing element provides a measurement signal indicative of an impedimetric property of the sensing layer; wherein the capture species is located adjacent and/or in the one or more through holes such that target analyte bound to the capture species can interact with the one or more through holes of the sensing layer so as to alter the impedimetric property of the sensing layer; and wherein the control unit is configured to determine the property of the analyte based on the impedimetric property of the sensing layer indicated by the measurement signal.

Aspect 13. The system of any of aspects 10 to 12, further comprising a heating unit configured to heat the plurality of sensing sites, wherein the sensing element provides a measurement signal indicative of a thermal property of the sensing element; and wherein the control unit is configured to determine the property of the analyte based on the thermal property of the sensing layer indicated by the measurement signal.

Aspect 14. The system of any of aspects 10 to 13, further comprising: a sample manipulation device for manipulating target analyte and/or non-analyte species on the sensing element, wherein the control unit is further configured to operate the sample manipulation device so as to apply a force to the sample sufficient to move specifically-bound target analyte on the sensing elements of each of the plurality of sensing sites; and wherein the control unit is configured to determine the property of the analyte in the sample based on the measurement signal during and/or after the control unit operates the sample manipulation device to move specifically-bound target analyte.

Aspect 15. The system of aspect 14, wherein the sample manipulation device is configured to cause specifically-bound analyte on the sensing elements of each of the plurality of sensing sites to enter the one or more through holes of the respective sensing layer.

Aspect 16. The system of one of aspect 14 or aspect 15, wherein the control unit is further configured to operate the sample manipulation device so as to apply a force to the sample sufficient to detach specifically-bound target analyte from at least one of the sensing elements of one of the plurality of sensing sites.

Aspect 17. A method for determining a property of an analyte in a sample, the method comprising: providing a sensor assembly according to any of aspects 1 to 9; providing a sample to the sensor assembly; and determining the property of the target analyte based on measurement signal from at least one sensing site of the plural sensing sites.

Aspect 18. The method of aspect 17, wherein the step of determining the property of the target analyte is based on measurement signals from at least two sensing sites of the plurality of sensing sites.

Aspect 19. The method of aspect 17 or aspect 18, wherein the measurement signal is indicative of an impedimetric property of the sensing layer; and wherein the capture species is located adjacent and/or in the one or more through holes such that target analyte bound to the capture species can interact with the one or more through holes of the sensing layer so as to alter the impedimetric property of the sensing layer; and wherein the step of determine the property of the analyte based on the impedimetric property of the sensing layer indicated by the measurement signal.

Aspect 20. The method of any of aspects 17 to 19, wherein the sensing element provides a measurement signal indicative of a thermal property of the sensing element; and wherein the method further comprises: heating or cooling the sensing elements; and determining a property of the analyte based on the thermal property of the sensing layer indicated by the measurement signal.

Aspect 21. The method of any of aspects 17 to 20, further comprising manipulating at least a portion of specifically-bound target analyte on the surface of each sensing element by applying a force to the sample sufficient to move specifically-bound analyte on each sensing element; and wherein determining the property of the target analyte in the sample is based on the measurement signal during and/or after the step of manipulating specifically-bound target analyte.

Aspect 22. The method of any of aspects 17 to 21, further comprising detaching at least a portion of the specifically-bound target analyte from at least one sensing element by applying a force to the sample sufficient to detach specifically-bound target analyte from the at least one sensing element, wherein determining the property of the analyte in the sample is based on the measurement signal for the at least one sensing element during and/or after the step of detaching the specifically-bound target analyte.

The invention claimed is:

1. A sensor assembly for a target analyte, comprising:
plurality of sensing sites, each sensing site comprising:
a sensing element, the sensing element comprising a sensing layer comprising an upper surface and a lower surface and one or more through holes, each of the one or more through holes extending from the upper surface to the lower surface; and a capture species configured to specifically bind with a target analyte provided to the sensing layer, wherein each sensing element provides a measurement signal indicative of the interaction of the target analyte with the sensing layer; and wherein each sensing site has a through hole configuration corresponding to a property of the one or more through holes, and wherein the through hole configuration of each sensing site is different.

2. The sensor assembly of claim 1, wherein the property of the one or more through holes comprises the number, dimensions and/or arrangement of the one or more through holes.

3. The sensor assembly of claim 1, wherein the property of the one or more through holes comprises:

a dimension of the one or more through holes of each of the plurality of sensing sites, the dimensions being selected from a depth or largest diameter of the one or more through holes; or an arrangement of the one or more through holes of each of the plurality of sensing sites selected from density of the one or more through holes per unit area of sensing site, spacing between the through holes and/or relative position of the through holes.

4. The sensor assembly of claim 1, wherein the one or more through holes of each of the plurality of sensing sites have a largest diameter of less than or equal to 2 μm and a depth of less than or equal to 2 μm.

5. The sensor assembly of claim 1, wherein the one or more through holes of each of the plurality of sensing sites have a largest diameter of from 50 nm to 1 μm.

6. The sensor assembly of claim 1, wherein the one or more through holes of each of the plurality of sensing sites have a depth of from 100 nm to 2 μm.

7. The sensor assembly of claim 1, wherein at least one sensing site comprises a plurality of through holes, and wherein the through holes are spaced apart by at least 500 nm.

8. The sensor assembly of claim 1, wherein each sensing site comprises a plurality of through holes having a largest diameter of less than or equal to 1000 nm and a depth of from 100 nm to 2 μm and wherein the through holes on each of the sensing sites are spaced apart by a spacing of from 2 μm to 6 μm.

9. The sensor assembly of claim 1, further comprising a fluid chamber for receiving a sample, wherein each sensing layer is arranged in the fluid chamber such that sample can reside above the upper surface, reside below the lower surface and pass through the through holes in the sensing layer.

10. A system for determining a property of a target analyte in a sample, the system comprising:

a sensor assembly according to claim 1; and a control unit configured to determine the property of the analyte, wherein the control unit is configured to determine the property of the analyte based on a measurement signal from at least one sensing site of the plural sensing sites.

11. The system of claim 10, wherein the control unit is configured to determine the property of the target analyte based on measurement signals from at least two sensing sites of the plurality of sensing sites.

12. The system of claim 10, wherein the sensing element provides a measurement signal indicative of an impedimetric property of the sensing layer;

wherein the capture species is located adjacent and/or in the one or more through holes such that target analyte bound to the capture species can interact with the one or more through holes of the sensing layer so as to alter the impedimetric property of the sensing layer; and wherein the control unit is configured to determine the property of the analyte based on the impedimetric property of the sensing layer indicated by the measurement signal.

13. The system of claim 10, further comprising a heating unit configured to heat the plurality of sensing sites, wherein the sensing element provides a measurement signal indicative of a thermal property of the sensing element; and wherein the control unit is configured to determine the property of the analyte based on the thermal property of the sensing layer indicated by the measurement signal.

14. The system of claim 10, further comprising:

a sample manipulation device for manipulating target analyte and/or non-analyte species on the sensing element, wherein the control unit is further configured to operate the sample manipulation device so as to apply a force to the sample sufficient to move specifically-bound target analyte on the sensing elements of each of the plurality of sensing sites; and wherein the control unit is configured to determine the property of the analyte in the sample based on the measurement signal during and/or after the control unit operates the sample manipulation device to move specifically-bound target analyte.

15. The system of claim 14, wherein the sample manipulation device is configured to cause specifically-bound analyte on the sensing elements of each of the plurality of sensing sites to enter the one or more through holes of the respective sensing layer.

16. A method for determining a property of an analyte in a sample, the method comprising:

providing a sensor assembly according to claim 1;

providing a sample to the sensor assembly; and determining the property of the target analyte based on measurement signal from at least one sensing site of the plural sensing sites.

17. The method of claim 16, wherein the step of determining the property of the target analyte is based on measurement signals from at least two sensing sites of the plurality of sensing sites.

18. The method of claim 16, wherein the measurement signal is indicative of an impedimetric property of the sensing layer; and wherein the capture species is located adjacent and/or in the one or more through holes such that target analyte bound to the capture species can interact with the one or more through holes of the sensing layer so as to alter the impedimetric property of the sensing layer; and wherein the step of determine the property of the analyte based on the impedimetric property of the sensing layer indicated by the measurement signal.

19. The method of claim 16, wherein the sensing element provides a measurement signal indicative of a thermal property of the sensing element; and wherein the method further comprises:

heating or cooling the sensing elements; and determining a property of the analyte based on the thermal property of the sensing layer indicated by the measurement signal.

20. The method of claim 16, further comprising manipulating at least a portion of specifically-bound target analyte on the surface of each sensing element by applying a force to the sample sufficient to move specifically-bound analyte on each sensing element; and wherein determining the property of the target analyte in the sample is based on the measurement signal during and/or after the step of manipulating specifically-bound target analyte.

\* \* \* \* \*